United States Patent
Pallerla et al.

(10) Patent No.: US 12,051,267 B2
(45) Date of Patent: Jul. 30, 2024

(54) FINGERPRINT SENSOR WITH DETECTION OF LATENT FINGERPRINTS

(71) Applicant: QUALCOMM Incorporated, San Diego, CA (US)

(72) Inventors: Rakesh Pallerla, Hyderabad (IN); Nirma Lnu, Jhunjhunu (IN); Raj Kumar, San Diego, CA (US); Livingstone Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 17/904,863

(22) PCT Filed: Apr. 13, 2021

(86) PCT No.: PCT/US2021/070383
§ 371 (c)(1),
(2) Date: Aug. 23, 2022

(87) PCT Pub. No.: WO2021/222917
PCT Pub. Date: Nov. 4, 2021

(65) Prior Publication Data
US 2023/0130790 A1    Apr. 27, 2023

(30) Foreign Application Priority Data
Apr. 29, 2020 (IN) .............. 202021018331

(51) Int. Cl.
*G06F 21/32* (2013.01)
*G06V 10/98* (2022.01)
(Continued)

(52) U.S. Cl.
CPC .......... *G06V 40/1388* (2022.01); *G06F 21/32* (2013.01); *G06V 10/993* (2022.01);
(Continued)

(58) Field of Classification Search
CPC ............. G06V 40/1388; G06V 10/993; G06V 40/1306; G06V 40/1365; G06V 40/1394; G06F 21/32; G06F 18/22
See application file for complete search history.

(56) References Cited

U.S. PATENT DOCUMENTS

| 7,505,613 B2 | 3/2009 | Russo |
| 9,633,269 B2 | 4/2017 | Gu et al. |

(Continued)

FOREIGN PATENT DOCUMENTS

| EP | 1295242 A1 | 3/2003 |
| WO | WO0124700 A1 | 4/2001 |

(Continued)

OTHER PUBLICATIONS

Cao K., et al., "Latent Fingerprint Recognition: Role of Texture Template", 2018 IEEE 9th International Conference on Biometrics Theory, Applications and Systems (BTAS), IEEE, Oct. 22, 2018 (Oct. 22, 2018), pp. 1-9, XP033541758, DOI: 10.1109/BTAS.2018.8698555, [retrieved on Apr. 24, 2019], The whole document.

(Continued)

*Primary Examiner* — Antonio Xavier
(74) *Attorney, Agent, or Firm* — QUALCOMM Incorporated

(57) ABSTRACT

A method may involve obtaining a latent fingerprint on a surface, storing the latent fingerprint, obtaining a live fingerprint on the surface, and authenticating the live fingerprint based in part on the stored latent fingerprint and in part on previously-authenticated fingerprint data. The method may involve rejecting authentication of the live fingerprint as a potential spoof, if the live fingerprint matches the latent fingerprint under a relatively strict correlation test. The method may also involve, when the live fingerprint doesn't closely match the latent fingerprint, granting authentication of the live fingerprint if the live fingerprint matches the (Continued)

previously-authenticated fingerprint data under a relatively loose correlation test.

17 Claims, 12 Drawing Sheets

(51) Int. Cl.
*G06V 40/12* (2022.01)
*G06V 40/13* (2022.01)

(52) U.S. Cl.
CPC ...... *G06V 40/1306* (2022.01); *G06V 40/1365* (2022.01); *G06V 40/1394* (2022.01)

(56) References Cited

U.S. PATENT DOCUMENTS

| | | | |
|---|---|---|---|
| 10,262,188 | B2 | 4/2019 | Agassy et al. |
| 2004/0252869 | A1* | 12/2004 | Kondo ............... G06V 40/1365 382/124 |
| 2005/0265587 | A1 | 12/2005 | Schneider |
| 2008/0253625 | A1 | 10/2008 | Schuckers et al. |
| 2009/0059761 | A1* | 3/2009 | Watanabe .......... G11B 7/00375 |
| 2009/0080717 | A1 | 3/2009 | Dias |
| 2016/0063296 | A1 | 3/2016 | Du et al. |
| 2020/0184191 | A1* | 6/2020 | Thompson ......... G06V 40/1365 |
| 2020/0234031 | A1* | 7/2020 | De Foras ........... G06V 40/1388 |
| 2021/0342614 | A1* | 11/2021 | Shen ....................... G06F 18/23 |
| 2022/0076401 | A1* | 3/2022 | Gardiner ................ G06T 11/60 |

FOREIGN PATENT DOCUMENTS

| | | |
|---|---|---|
| WO | WO0184478 A1 | 11/2001 |
| WO | WO2018212696 A1 | 11/2018 |
| WO | WO2020227730 A1 | 11/2020 |

OTHER PUBLICATIONS

International Search Report and Written Opinion—PCT/US2021/070383—ISA/EPO—Sep. 20, 2021.
Partial International Search Report—PCT/US2021/070383—ISA/EPO—Jul. 16, 2021.
Yusuf N., et al., "A Survey of Biometric Approaches of Authentication", International Journal of Advanced Computer Research, vol. 10. No. 47, Mar. 31, 2020 (Mar. 31, 2020), pp. 96-104, XP055819699, Bhopal ISSN: 2249-7277, DOI: 10.19101/IJACR.2019.940152, Retrieved from the Internet: URL: https://www.proquest.com/openview/ae9f2ea4cdaf003478cc105b70ccfc0e/1.pdf?pq-origsite=gscholar&cbl=1626343, https://media.proquest.com/media/hms/PFT/I/BH0BG?a=ChgyMDIxMDYzMDEwMTQINTYxNjo20TA0MTAaCk90RV9TRUFSQ0giDTg2LjgILjE3Mi4xMDcqBzE2MjYzNDMyCjIz0Dk3MzQyNDg6EE9wZW52aWV3Q210YXRpb25CATBSBk9ubGluZVoCRIRiAIBGVGoKMjAyMC8wMy8wMXIKMjAyMC8wMy8zMXoAkgEGT25saW51ygFyTW96aWxsYS81LjAgKEFdpbmRvd3MgTIQgMTAuMDsgV21uNjQ7 7 the whole document.
Sammoura F., et al., "Latent Fingerprint Detection Using Rotationally-Invariant Vectors", Technical Disclosure Commons, May 2020, pp. 1-12.

* cited by examiner

FINGERPRINT SENSOR WITH DETECTION OF LATENT FINGERPRINTS

CROSS-REFERENCE TO RELATED APPLICATION

This application claims the benefit of priority from Indian Provisional Application No. 202021018331, filed on Apr. 29, 2020, which is hereby incorporated by reference in its entirety.

TECHNICAL FIELD

This disclosure relates generally to fingerprint sensors and methods for using such systems.

DESCRIPTION OF THE RELATED TECHNOLOGY

Fingerprint sensors including ultrasonic and other types of fingerprint sensors have been included in devices such as smartphones, cash machines and cars to authenticate a user. Although some existing fingerprint sensors can provide satisfactory performance, improved fingerprint sensors would be desirable. In particular, existing fingerprint sensors are susceptible to false positive authentication due to latent fingerprints (i.e., a fingerprint, of an authorized user, left on a surface by deposits of oils and other materials). As an example, existing fingerprint sensors can be tricked into accepting a latent fingerprint as a valid fingerprint, even when no actual finger is present.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. The apparatus may include a fingerprint sensor and a control system. In some examples, the control system is configured to receive first signals from the fingerprint sensor, the first signals including signals corresponding to residual material; receive second signals from the fingerprint sensor, the second signals including signals corresponding to at least a target object; and perform an authentication process based, at least in part, on the first signals and the second signals.

According to some examples, the fingerprint sensor includes an ultrasonic fingerprint sensor, the first signals include first ultrasonic receiver signals including signals corresponding to reflections of first ultrasonic waves from the residual material on the surface, and the second signals includes second ultrasonic receiver signals including signals corresponding to at least the target object.

According to some examples, the residual material is on a surface, the surface being a fingerprint sensor surface or a surface of a device proximate an area in which the fingerprint sensor resides and the target object is in contact with or adjacent to the surface.

According to some examples, performing the authentication process based, at least in part, on the first signals and the second signals involves determining that the first signals form a fingerprint image with an image quality (IQ) metric above one or more thresholds.

According to some examples, the apparatus further includes a display and the control system is further capable of controlling the display to provide a prompt to clean a portion of the fingerprint sensor after determining that the first signals form the fingerprint image with the IQ metric above the one or more thresholds.

According to some examples, performing the authentication process based, at least in part, on the first signals and the second signals involves determining the residual material forms a latent fingerprint by determining that the first signals form a fingerprint image.

According to some examples, performing the authentication process based, at least in part, on the first signals and the second signals involves comparing a first fingerprint image based on the first signals with a second fingerprint image based on the second signals, determining that the first and second fingerprint images satisfy a correlation test, and, based on determining that the first and second fingerprint images satisfy the correlation test, rejecting authentication of the target object.

According to some examples, performing the authentication process based, at least in part, on the first signals and the second signals involves: comparing a first fingerprint image based on the first signals with a second fingerprint image based on the second signals, determining that the first and second fingerprint images fail a first correlation test requiring a first level of correlation, retrieving a third fingerprint image from a storage device in the apparatus, the third fingerprint image representing a previously-authenticated fingerprint, determining that the second and third fingerprint images satisfy a second correlation test requiring a second level of correlation, the second level of correlation being less than the first level of correlation, and based on determining that the second and third fingerprint images satisfy the second correlation test, authenticating the target object.

According to some examples, the first correlation test limits relative rotation between the first and second fingerprint images to being less than 10 degrees of rotation.

According to some examples, the first correlation test limits relative rotation between the first and second fingerprint images to being less than 10 degrees of rotation and the second correlation test allows relative rotation between the second and third fingerprint images to be greater than 30 degrees of rotation.

According to some examples, the first correlation test limits relative translation between the first and second fingerprint images to being less than a threshold amount and the second correlation test allows relative translation between the second and third fingerprint to be greater than the threshold amount.

According to some examples, the control system is further configured for receiving third signals from the fingerprint sensor, the third signals including signals corresponding to at least the target object or at least an additional target object, where the control system is configured to receive the third signals before receiving the first signals and before receiving the second signals; retrieving an authenticated fingerprint image from a storage device in the apparatus; and authenticating the target object or the additional target object based on a comparison of the authenticated fingerprint image with the third signals.

According to some examples, the control system is further configured for controlling the fingerprint sensor so that receiving the first signals occurs temporally after and is at least partly triggered by the authentication of the target object or the additional target object based on the comparison of the authenticated fingerprint image with the third signals.

Other innovative aspects of the subject matter described in this disclosure may be implemented in a method. The method may involve receiving first signals from a fingerprint sensor, the first signals including signals corresponding to residual material deposited on a surface, the surface being a fingerprint sensor surface or a surface of a device proximate an area in which the fingerprint sensor resides and the method may involve controlling at least one of a display or a speaker to provide a prompt, based on the first signals, to clean the surface.

One innovative aspect of the subject matter described in this disclosure may be implemented in an apparatus. The apparatus may include a fingerprint sensor and a control system. The control system may be configured for receiving first signals from the fingerprint sensor; receiving second signals from the fingerprint sensor; comparing a first fingerprint image based on the first signals with a second fingerprint image based on the second signals; determining that the first and second fingerprint images satisfy a correlation test; and based on determining that the first and second fingerprint images satisfy the correlation test, rejecting authentication based on the second signals.

According to some examples, the first fingerprint image is an image of residue, the residue formed at least in part by an object previously authenticated by the apparatus.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

Figure 1A:
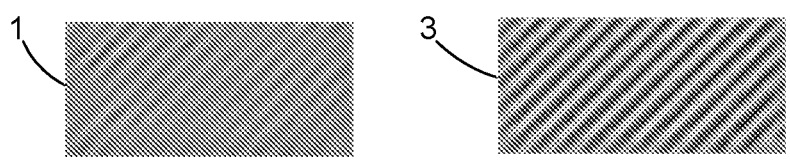
FIG. 1A shows examples of latent and live fingerprint images obtained by an ultrasonic fingerprint sensor.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, automatic teller machines (ATMs), parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, automobile doors, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Latent fingerprints (i.e., residue patterned by a finger) on a fingerprint sensor surface are a common occurrence. In certain situations, a latent fingerprint can have sufficient ridge-valley definition and sufficient contrast that, when scanned by a fingerprint sensor, the latent fingerprint is erroneously accepted as being from an authorized finger. In other words, a fingerprint sensor may be susceptible to false positive matches when a latent fingerprint is left by an authorized user and the fingerprint sensor is later triggered. (As used herein, the term "finger" can refer to any digit, including a thumb. Accordingly, the term "fingerprint" as used herein may refer to a print from any digit, including a thumb.)

In some implementations, an apparatus may include a fingerprint sensor and a control system. According to some examples, the apparatus may be configured for obtaining a latent fingerprint (e.g., an image of residue, patterned with a user's fingerprint, on a fingerprint sensor surface). The control system may be configured to compare one or more subsequently captured fingerprints to the latent fingerprint.

The control system may be configured to authenticate the one or more subsequently-captured fingerprints by comparison to the latent fingerprint and comparison to one or more previously-authenticated fingerprints (or other fingerprint data). The control system may be configured to reject authentication of a subsequently-captured fingerprint when the subsequently-captured fingerprint closely matches the latent fingerprint (e.g., within certain relatively strict guidelines, which are described in more detail herein). The control system may be further configured to authenticate the subsequently-captured fingerprint based on a looser matching (e.g., within certain relatively loose guidelines, which are described in more detail herein) of the subsequently-captured fingerprint to one or more previously-authenticated fingerprints. In this manner, a fingerprint sensor can detect a latent fingerprint and reduce or prevent the possibility of false positive authentication based on the latent fingerprint.

Particular implementations of the subject matter described in this disclosure may be implemented to realize one or more of the following potential advantages. According to some examples, identifying the presence of a latent fingerprint on a fingerprint sensor may enable the fingerprint sensor to reject authentication attempts relying upon latent fingerprints. For example, the fingerprint sensor may be able to distinguish between latent fingerprints and live fingerprints, by comparing a previously-captured latent fingerprint with a current fingerprint. When the previously-captured latent fingerprint closely matches the current fingerprint, the fingerprint sensor may determine that the current fingerprint is a potential spoofing attempt, as opposed to a live fingerprint. The fingerprint sensor may then refuse to authenticate the current fingerprint, even if the current fingerprint otherwise matches a previously-authorized fingerprint.

FIG. 1A shows examples of a latent and live fingerprint images obtained by an ultrasonic fingerprint sensor. Image 1 is an image of a latent fingerprint (i.e., residue imprinted with the patterns of a finger) and image 3 is an image of a live fingerprint (i.e., a finger) captured by an ultrasonic fingerprint sensor. Image 1 may also be referred to as an air image, as image 1 was captured with no object such as a finger on or near the surface of the ultrasonic fingerprint sensor. In contrast, image 3 was captured with a finger on or near the surface of the ultrasonic fingerprint sensor. The surface of the fingerprint sensor may, as an example, include the platen 225 of FIG. 2D and/or platen 40 of FIGS. 5A, 5B, and 5C.

In these examples, image 1 and image 3 correspond to the same portion of the same finger. Image 3 was obtained when the finger was touching the surface of the fingerprint sensor, while image 1 was obtained after the finger was removed from the surface of the fingerprint sensor. As can be seen from FIG. 1A, image 1 closely matches image 3. As a result, there is a risk that the ultrasonic fingerprint sensor could falsely authenticate image 1 and thus falsely unlock a device or otherwise authenticate a user, despite the fact that the user did not provide a live finger for scanning at the time of capturing image 1.

Figure 1B:
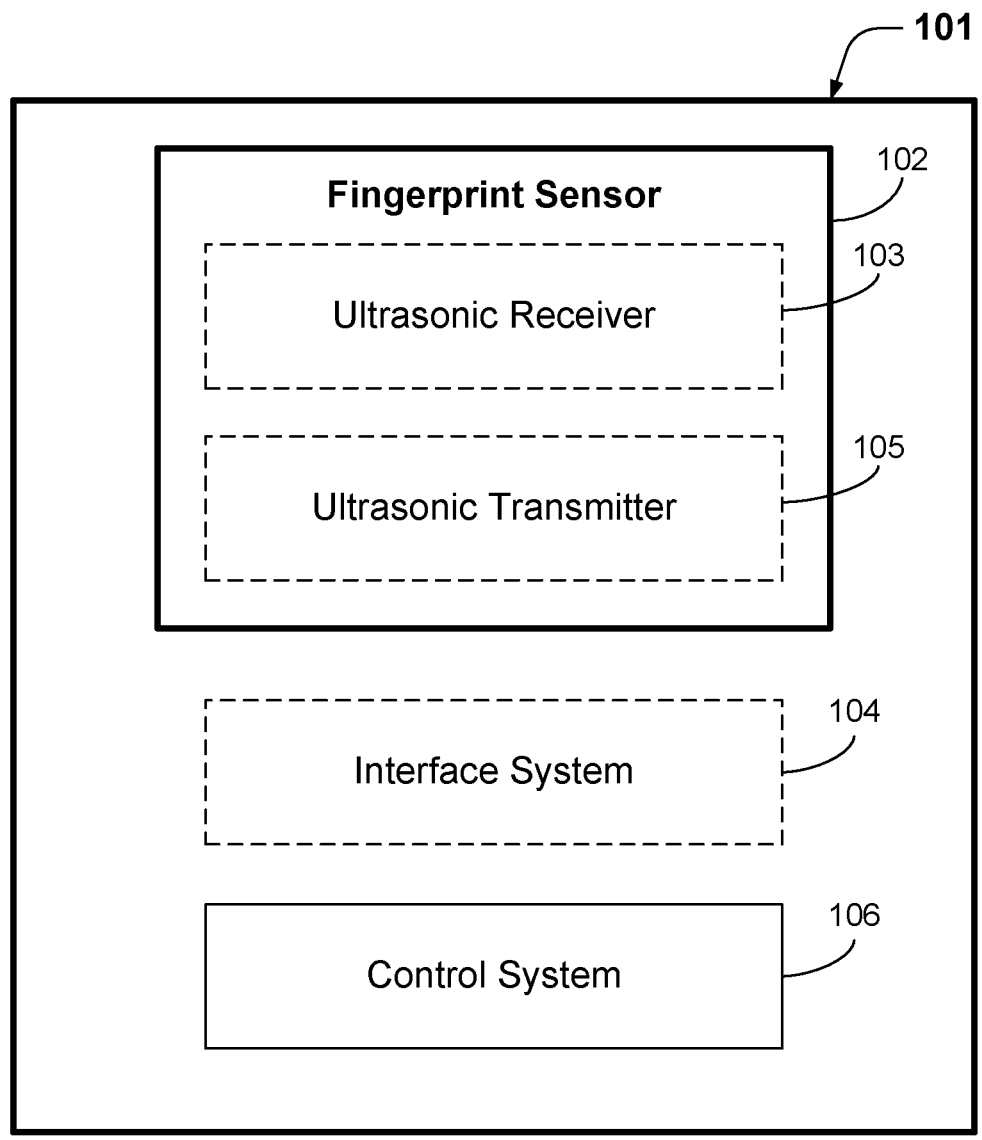
FIG. 1B is a block diagram that shows example components of an apparatus according to some disclosed implementations.

FIG. 1B is a block diagram that shows example components of an apparatus according to some disclosed implementations. In this example, the apparatus 101 includes an fingerprint sensor 102 and a control system 106. Some implementations of the apparatus 101 may include an interface system 104.

The fingerprint sensor 102 may be any desired type of fingerprint sensor including, but not limited to, an ultrasonic fingerprint sensor, an optical fingerprint sensor, a capacitive fingerprint sensor, a CMOS fingerprint sensor, and a thermal fingerprint sensor. In some examples, the fingerprint sensor 102 is formed from a combination of sensor types (e.g., two or more of ultrasonic, optical, capacitive, CMOS, and thermal fingerprint sensing technologies). It should be understood that portions of this disclosure referring to ultrasonic fingerprint sensors, or any other specific type of fingerprint sensors, are not limited to ultrasonic fingerprint sensor technologies, or whatever specific technology is referenced. The present disclosure is broadly applicable to fingerprint sensors and is not specific to ultrasonic fingerprint sensors, or any other specific type of fingerprint sensors.

In some examples, as suggested by the dashed lines within the fingerprint sensor 102, the fingerprint sensor 102 may be implemented as an ultrasonic fingerprint sensor that includes an ultrasonic receiver 103 and a separate ultrasonic transmitter 105. In some such examples, the ultrasonic transmitter 105 may include an ultrasonic plane-wave generator, such as those described below.

However, various examples of fingerprint sensors 102 are disclosed herein, some of which may include a separate ultrasonic transmitter 105 and some of which may not. Although shown as separate elements in FIG. 1B, in some implementations the ultrasonic receiver 103 and the ultrasonic transmitter 105 may be combined in an ultrasonic transceiver system. For example, in some implementations, the fingerprint sensor 102 may be an ultrasonic sensor and may include a piezoelectric receiver layer, such as a layer of polyvinylidene fluoride PVDF polymer or a layer of polyvinylidene fluoride-trifluoroethylene (PVDF-TrFE) copolymer. In some implementations, a separate piezoelectric layer may serve as the ultrasonic transmitter. In some implementations, a single piezoelectric layer may serve as both a transmitter and a receiver. In some implementations that include a piezoelectric layer, other piezoelectric materials may be used in the piezoelectric layer, such as aluminum nitride (AlN) or lead zirconate titanate (PZT). The fingerprint sensor 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, PMUT elements in a single-layer array of PMUTs or CMUT elements in a single-layer array of CMUTs may be used as ultrasonic transmitters as well as ultrasonic receivers.

In an ultrasonic sensor system, an ultrasonic transmitter may be used to send an ultrasonic wave through an ultrasonically transmissive medium or media and towards an object to be detected. The transmitter may be operatively coupled with an ultrasonic sensor configured to detect portions of the ultrasonic wave that are reflected from the object. For example, in ultrasonic fingerprint imagers, an ultrasonic pulse may be produced by starting and stopping the transmitter during a very short interval of time. At each material interface encountered by the ultrasonic pulse, a portion of the ultrasonic pulse is reflected.

For example, in the context of an ultrasonic fingerprint imager, the ultrasonic wave may travel through a platen on which a person's finger may be placed to obtain a fingerprint image. After passing through the platen, some portions of the ultrasonic wave encounter skin that is in contact with the platen, e.g., fingerprint ridges, while other portions of the ultrasonic wave encounter air, e.g., valleys between adjacent ridges of a fingerprint, and may be reflected with different intensities back towards the ultrasonic sensor. The reflected signals associated with the finger may be processed and converted to a digital value representing the signal strength of the reflected signal. When multiple such reflected signals are collected over a distributed area, the digital values of such signals may be used to produce a graphical display of the signal strength over the distributed area, for example by converting the digital values to an image, thereby producing an image of the fingerprint. Thus, an ultrasonic sensor system may be used as a fingerprint imager or other type of biometric scanner. In some implementations, the detected signal strength may be mapped into a contour map of the finger that is representative of the depth of the ridge structure detail.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system 106 may include a dedicated component for controlling the ultrasonic fingerprint sensor 102. The control system 106 also may include (and/or be configured for communication with) one or more memory devices, such as one or more random access memory (RAM) devices, read-only memory (ROM) devices, etc. Accordingly, the apparatus 101 may have a memory system that includes one or more memory devices, though the memory system is not shown in FIG. 1B. The control system 106 may be configured for receiving and processing data from the ultrasonic fingerprint sensor 102, e.g., from the ultrasonic receiver 103. If the apparatus 101 includes a separate ultrasonic transmitter 105, the control system 106 may be configured for controlling the ultrasonic transmitter 105, e.g., as disclosed elsewhere herein. In some implementations, functionality of the control system 106 may be partitioned between one or more controllers or processors, such as between a dedicated sensor controller and an applications processor of a mobile device. Some examples are described below.

Some implementations of the apparatus 101 may include an interface system 104. In some examples, the interface system 104 may include a wireless interface system. In some implementations, the interface system 104 may include a user interface system, one or more network interfaces, one or more interfaces between the control system 106 and a memory system, and/or one or more interfaces between the control system 106 and one or more external device interfaces (e.g., ports or applications processors). The user interface may include, as examples, a display, a speaker, an audio port, a video port, a touch pad, a touch screen, and buttons.

The interface system 104 may be configured to provide communication (which may include wired or wireless communication, such as electrical communication, radio communication, etc.) between components of the apparatus 101. In some such examples, the interface system 104 may be configured to provide communication between the control system 106 and the ultrasonic fingerprint sensor 102. According to some such examples, the interface system 104 may couple at least a portion of the control system 106 to the ultrasonic fingerprint sensor 102, e.g., via electrically conducting material (e.g., via conductive metal wires or traces). If the apparatus 101 includes an ultrasonic transmitter 105 that is separate from the ultrasonic receiver 103, the interface system 104 may be configured to provide communication between at least a portion of the control system 106 and the ultrasonic transmitter 105. According to some examples, the interface system 104 may be configured to provide communication between the apparatus 101 and other devices and/or human beings. In some such examples, the interface system 104 may include one or more user interfaces. The interface system 104 may, in some examples, include one or more network interfaces and/or one or more external device interfaces (such as one or more universal serial bus (USB) interfaces or a serial peripheral interface (SPI)). In some implementations, the apparatus 101 may include a memory system. The interface system 104 may, in some examples, include at least one interface between the control system 106 and a memory system.

The apparatus 101 may be used in a variety of different contexts, some examples of which are disclosed herein. For example, in some implementations a mobile device may include at least a portion of the apparatus 101. In some implementations, a wearable device may include at least a portion of the apparatus 101. The wearable device may, for example, be a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (e.g., a smartphone). The interface system 104 also may, in some such examples, reside in more than one device.

Figure 2A:
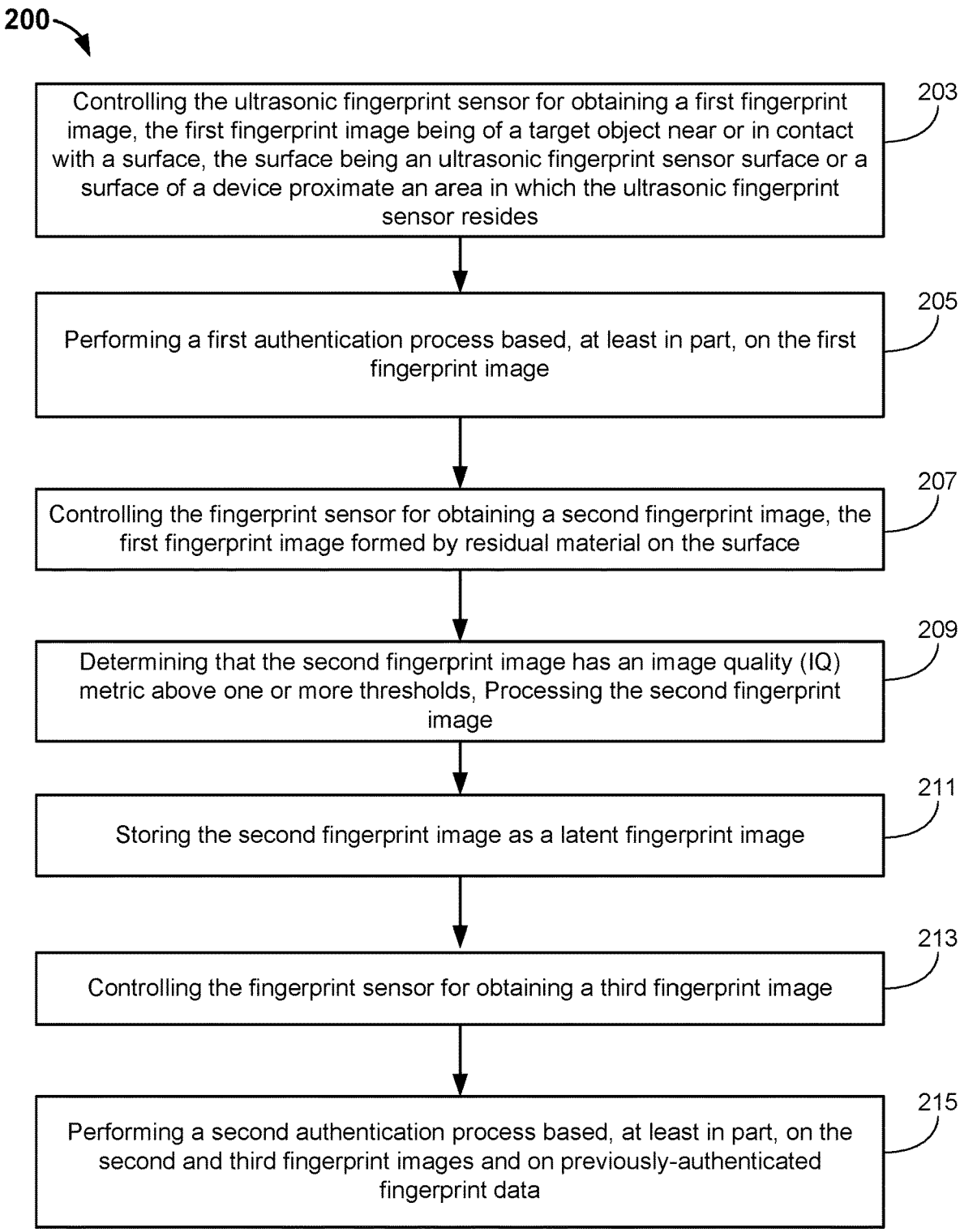
FIGS. 2A, 2B, and 2C are flow diagrams that provide example blocks of some methods disclosed herein.
Figure 2B:
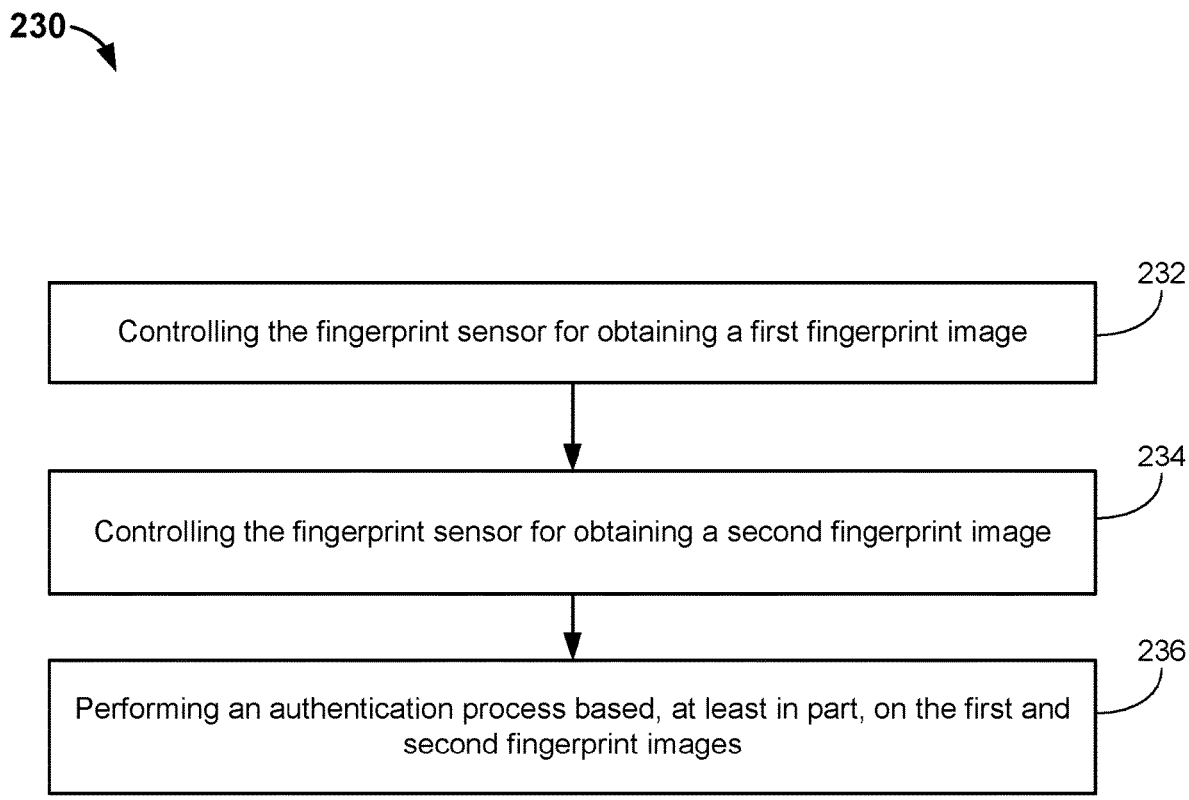
Figure 2C:
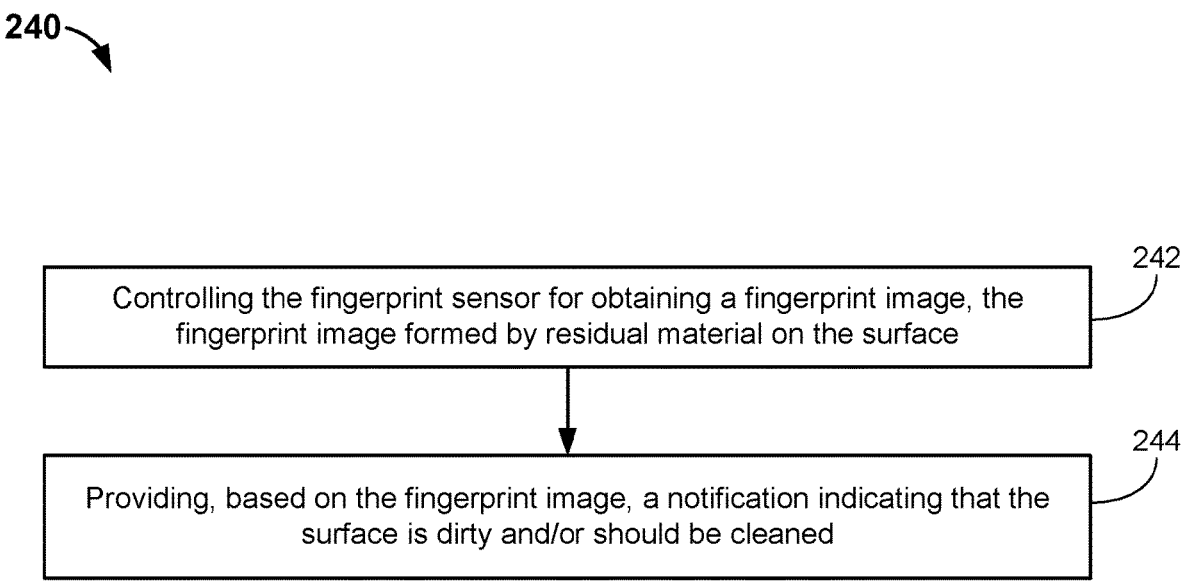

FIGS. 2A, 2B, and 2C are flow diagrams that provides example blocks of some methods disclosed herein. The blocks of FIGS. 2A, 2B, and 2C may, for example, be performed by the apparatus 101 of FIG. 1B or by a similar apparatus. As with other methods disclosed herein, the method 200 outlined in FIG. 2A, the method 230 outlined in FIG. 2B, and the method 240 outlined in FIG. 2C may include more or fewer blocks than indicated. Moreover, the blocks of methods disclosed herein are not necessarily performed in the order indicated. In some examples, some blocks of methods disclosed herein may be performed concurrently.

According to the example of FIG. 2A, the method 200 is a method of controlling an apparatus that includes a fingerprint sensor. According to this implementation, block 203 involves controlling (e.g., via a control system of the apparatus, such as the control system 106 of the apparatus 101 that is shown in FIG. 1B) the fingerprint sensor for obtaining a first fingerprint image of a target object in contact with or near a surface. The surface may be a fingerprint sensor surface or a surface of a device proximate an area in which the fingerprint sensor resides.

In some examples, such as when the fingerprint sensor is implemented with an ultrasonic fingerprint sensor, block 203 may involve transmission of first ultrasonic waves toward the target object. Additionally, block 203 may involve controlling the ultrasonic fingerprint sensor to transmit ultrasonic waves in the range of 1 MHz to 30 MHz. For example, an ultrasonic transmitter of the ultrasonic fingerprint sensor may be controlled for transmission of the first ultrasonic waves. Furthermore, block 203 may involve receiving first ultrasonic receiver signals from the ultrasonic fingerprint sensor. The first ultrasonic receiver signals include signals corresponding to reflections of the first ultrasonic waves from the target object.

According to some examples, the apparatus may include a touch sensor system. In some such examples, a previous process of the method 200 may have involved determining, by a control system, a target object position based on one or more signals received from the touch sensor system. Block 203 may, in some such examples, involve controlling the fingerprint sensor according to the digit position. However, in some alternative examples, the control system may be configured for determining a digit position based on one or more signals received from the fingerprint sensor.

In this implementation, block 205 involves performing an authentication process based, at least in part, on the fingerprint image obtained in block 203. In some instances, block 203 may involve obtaining fingerprint image data and block 205 may involve authenticating the fingerprint image data. As used herein, the term "fingerprint image data" may refer generally to data obtained from, or data based on signals obtained from, an ultrasonic receiver or data obtained from a fingerprint sensor utilizing another technology. In some instances, the fingerprint image data may correspond, at least in part, to a target object such as a finger that may include a fingerprint. The fingerprint image data may or may not be presented in a form that is recognizable to a human being as being an image. For example, the fingerprint image data may be, or may include, a data structure in which numerical values are arranged and/or stored. The numerical values may, in some examples, correspond to signals received from an ultrasonic fingerprint sensor, an optical sensor system, a capacitive sensor system, etc. In some examples, the fingerprint image data may correspond to signals received from a sensor system during a time window. In some instances, the fingerprint image data may correspond to signals received from a particular area, such as a fingerprint contact area.

In some examples, block 205 may involve extracting features from the ultrasonic receiver signals or the fingerprint sensor. The authentication process may be based, at least in part, on the features. According to some examples, the features may be fingerprint features, such as the locations, orientations and/or types of fingerprint minutiae. In some such examples, the fingerprint image data may include indications of one or more fingerprint features detected in at least a portion of the signals from the sensor system (such as an ultrasonic fingerprint sensor). The fingerprint features may include one or more fingerprint ridge features and one or more fingerprint valley features. The fingerprint features may, for example, be detected by a control system such as the control system 106 of FIG. 1B.

In ultrasonic systems, signals indicating fingerprint ridge features may generally be obtained from sensor pixels of the ultrasonic fingerprint sensor that are responding to ultrasonic waves that have been reflected from platen/fingerprint ridge interfaces. Signals indicating fingerprint valley features may generally be obtained from sensor pixels that are responding to ultrasonic waves that have been reflected from platen/fingerprint valley interfaces. The reflections from a platen/fingerprint valley interface will generally be reflections from a platen/air interface, whereas the reflections from a platen/fingerprint ridge interface will generally be reflections from a platen/skin interface, corresponding to areas in which fingerprint ridges are in contact with a platen. Because a platen/fingerprint valley interface will generally have a much higher acoustic impedance contrast than a platen/fingerprint ridge interface, a platen/fingerprint valley interface will generally produce relatively higher-amplitude reflections.

In some examples, block 207 may involve controlling the fingerprint sensor for obtaining a second fingerprint image (e.g., a latent fingerprint image) formed by residual material on the surface of the fingerprint sensor (or the surface of the device proximate the area in which the fingerprint sensor resides). Performance of block 207 may triggered by the performance of block 203, the performance of block 205, or some other criteria. As a first example, a successful authentication of the first fingerprint image in block 205 informs the apparatus of the potential that residue on the fingerprint sensor may form a latent fingerprint capable of use in a false authentication attack. Thus, performance of block 207 may be initiated based on a successful authentication in block 205 (e.g., based on determining that the fingerprint obtained in block 203 belongs to an authorized person). As a second example, block 207 may be performed or triggered whenever the fingerprint sensor obtains a fingerprint, even if that fingerprint doesn't authenticate to an authorized person). In these two examples, block 207 may be performed after the finger is removed from the fingerprint sensor (e.g., after a time delay following block 203 and/or block 205, after another sensor such as a touch sensor indicates that the finger has been removed, etc.).

As another example, block 207 may be performed randomly, in a scheduled manner, upon unlocking and/or powering up the apparatus, and/or based on other factors (e.g., even without the prior capture and/or authentication of a live fingerprint). It may be beneficial to check for latent fingerprints based on such factors to detect, as an example, a latent fingerprint deposited when the apparatus is powered off, in a sleep mode, or otherwise inactive. In some examples, block 203 and/or block 205 may be omitted entirely and/or block 207 may be performed randomly, in a scheduled manner, upon unlocking and/or powering up the apparatus, and/or based on other factors.

According to some implementations, block 209 involves determining whether the second (latent) fingerprint image has image quality (IQ) metrics above one or more thresholds. In some examples, the image quality metrics may be based, at least in part, on contrast thresholds. According to some examples, the image quality metrics may be based, at least in part, on signal-to-noise ratio thresholds. In some implementations, the image quality metrics may be based, at least in part, on the mean and/or thresholds related to the standard deviation of the signal amplitude. In some examples, the image quality metrics may be based, at least in part, on thresholds related to the skewness and/or the kurtosis of the signal. In some implementations, the image quality metrics may be based on thresholds related to all of the foregoing parameters. As an example, block 209 may serve to identify when there is sufficient residue (e.g., residual oils, moisture, dirt, etc.) on the surface of the fingerprint sensor and when the residue is sufficiently patterned with a fingerprint pattern, such that the residue forms a latent fingerprint capable of use in a false authentication attack.

Block 209 may, in some examples, also involve processing of the second (latent) fingerprint image. Such processing may occur before, after, or as part of determining whether the second (latent) fingerprint image has image quality (IQ) metrics above one or more thresholds. As an example, such processing may include inverting the second (latent) fingerprint image, such that areas that the fingerprint sensor would normally interpreted as ridges are instead interpreted as valleys, and areas normally interpreted as valleys are instead interpreted as ridges.

The potential inversion of the second (latent) fingerprint image in block 209 may be desired, in some situations, because of the nature of latent fingerprints as compared to live fingerprints. In particular, a latent fingerprint is a bit like an negative impression of a live fingerprint. As discussed above, ultrasonic fingerprint sensors have sensor pixels that generally respond to ultrasonic waves (1) reflected from platen/fingerprint valley interfaces (e.g., platen/air interfaces) or (2) reflected from platen/fingerprint ridge interfaces (e.g., platen/skin interfaces). Because of the processes by which latent fingerprints are deposited, scans of latent fingerprints are often inverted relative to live fingerprints. As an example, when a user presses an oily finger onto an image sensor and leaves a latent fingerprint, the oil tends to be deposited in the locations of valleys rather than ridges. Thus, when ultrasonic waves are transmitted into the latent fingerprint, the reflections from the interface with the "fingerprint valleys" are no longer platen/air interfaces, but are platen/oil interfaces. Similarly, the interface with the "fingerprint ridges" are no longer platen/skin interfaces, but are platen/air interfaces. Because the platen/oil interface will generally have a lower acoustic impedance than the platen/air interface, the regions associated with fingerprint valleys will generally produce lower-amplitude reflections (an inverse of the situation for live fingerprints). Thus, it may be desirable to invert the second (latent) fingerprint image in block 209

According to some implementations, block 211 involves storing, for the purposes of later authentication processes, the second fingerprint image as a latent fingerprint image. In some examples, block 211 may additionally or alternatively involve providing user feedback regarding the detection of the latent fingerprint (e.g., detection of residue patterned with a fingerprint on the fingerprint sensor). As examples, block 211 may involve displaying a message, providing an alert sound, or otherwise indicating to a user that the fingerprint sensor is dirty, that the fingerprint sensor is temporarily unavailable, that a latent fingerprint is deposited on the sensor, or some other related indication.

According to this implementation, block 213 involves controlling the fingerprint sensor for obtaining a third fingerprint image. Block 213 may be triggered by a user request to scan a fingerprint, as an example.

According to this implementation, block 215 involves an authentication process based, at least in part, on the second and third fingerprint images and on previously-authenticated fingerprint data. The authentication process of block 215 may, if desired, be broken down into first and second stages, which may be performed concurrently, sequentially, or even in reverse order. In the first stage of the authentication process of block 215, the third fingerprint image may be compared with the second (latent) fingerprint image under a relatively strict co-relation test. In the second stage of the authentication process, the third fingerprint image may be compared with previously-authenticated fingerprint data under a relatively lenient co-relation test. When the third fingerprint image matches the latent fingerprint under the strict co-relation test, the third fingerprint may be rejected as a potential spoofing attempt. However, if the third fingerprint fails to match the latent fingerprint under the strict co-relation test but does match the previously-authenticated fingerprint data under the lenient co-relation test, the third fingerprint may be accepted or authenticated as legitimate.

Latent fingerprints are effectively fixed on the fingerprint sensor surface and do not rotate, translate, swell, shrink, or otherwise change significantly over time. In contrast, a user providing live fingerprints is likely to put their finger on the fingerprint sensor surface at different orientations, at different positions, and with different levels of force. Additionally, a user's finger can swell or shrink over time, causing additional distortions in their fingerprint. These kinds of changes in live fingerprints are generally accepted by fingerprint sensors, as rejecting them would annoy users without significant increases in security. These differences in the variability of latent and live fingerprints is exploited by the present implementations to identify potential spoofing events based on latent fingerprints.

In some implementations, the relatively strict co-relation test of block 215 may determine whether a current fingerprint sample is merely a latent fingerprint. The relatively strict co-relation test may permit, as an example, only limited spatial variations between the second and third fingerprint images. For example, the relatively strict co-relation test may only be satisfied if the third fingerprint image matches the second (latent) fingerprint image with less than 30 degrees of rotation, less than 25 degrees of rotation, less than 20 degrees of rotation, than 15 degrees of rotation, less than 10 degrees of rotation, less than 5 degrees of rotation, or less than 1 degree of rotation. The strict co-relation test may permit at least some rotation between the third fingerprint image and the second (latent) fingerprint image, e.g., to account for measurement inaccuracies between multiple scans by the fingerprint sensor. The relatively strict co-relation test may also require a level of correlation in the patterns of ridges and valleys that is higher than that required under the relatively lenient co-relation test. When the relatively strict co-relation test of block 215 is satisfied, the apparatus may determine that the third fingerprint is a likely spoofing attempt and may reject authentication of the third fingerprint.

The apparatus may respond to the detection of a likely spoofing attempt in block 215 in a variety of ways. As a first example, the apparatus may reject the authentication attempt (see, e.g., GUI 300a of FIG. 3A). As a second example, the apparatus may reject the authentication attempt and also provide the user with an indication of some sort (e.g., an indication that the fingerprint sensor area seems dirty and/or instructions to clean the fingerprint sensor and try again, as in GUI 300b of FIG. 3A and GUI 300c of FIG. 3B). As a third example, the apparatus may reject the authentication attempt and also increase a security level or anti-spoofing countermeasure level of the apparatus (e.g., activate additional features of the fingerprint sensor such as one or more sensors for temperature, force, impedance, heartrate, and/or blood flow, which may provide additional liveness feedback). As a fourth example, the apparatus may reject the authentication attempt and also disable, at least temporarily, the fingerprint sensor and instead request the user provide a PIN, password, or other independent biometric authentication (see, e.g., GUI 300d of FIG. 3B). As an additional example, the apparatus may notify an owner, user, operator, manufacturer, or other person associated with the apparatus upon detection of repeated latent fingerprint spoofing attempts. In such situations, the notification may be provided via a display or other user interface of the device or may be provided via an independent communication channel.

In some implementations, the apparatus may take a first action in response to a first detection of a potential latent fingerprint spoofing attempt and may escalate to additional actions in response to additional detections of potential latent fingerprint spoofing attempts. For example, the apparatus may merely reject a first set of potential latent fingerprint spoofing attempts, may ask the user to clean the sensor for a second subsequent set of potential latent fingerprint spoofing attempts, and may escalate further for a third subsequent set of potential latent fingerprint spoofing attempts.

In some implementations, the relatively lenient co-relation test of block 215 may determine whether a current fingerprint sample adequately matches previously-authenticated fingerprint data. The relatively lenient co-relation test of block 215 may be similar to that of the authentication process described in connection with block 205.

The relatively lenient co-relation test may permit, as an example, significant spatial variations between the third fingerprint image and the previously-authenticated fingerprint data. For example, the relatively lenient co-relation test may be satisfied if the third fingerprint image matches the previously-authenticated fingerprint data, even allowing limited or unlimited relative rotation (e.g., permitting more than 30 degrees of relative rotation). The relatively lenient co-relation test may also require a level of correlation in the patterns of ridges and valleys that is lower than that required under the relatively strict co-relation test. When the relatively strict co-relation test of block 215 using the latent fingerprint is not satisfied, but the lenient co-relation test using the previously-authenticated fingerprint data is satisfy, the apparatus may determine that the third fingerprint is unlikely to be a spoofing attempt and is instead a valid and authentic fingerprint. The apparatus may then grant authentication of the third fingerprint.

According to the example of FIG. 2B, the method 230 is a method of controlling an apparatus that includes a fingerprint sensor. According to this implementation, block 232 involves controlling (e.g., via a control system of the apparatus, such as the control system 106 of the apparatus 101 that is shown in FIG. 1B) the fingerprint sensor for obtaining a first fingerprint image. The first fingerprint image may be an image of residual material on a surface of the fingerprint sensor (or a surface of a device proximate the area in which the fingerprint sensor resides). Thus, the first fingerprint image may be an image of a latent fingerprint.

According to some implementations, block 234 involves controlling the fingerprint sensor for obtaining a second fingerprint image. The second fingerprint image may be an image of a target object, such as a finger, in contact with the surface of the fingerprint sensor (or the surface of the device proximate the area in which the fingerprint sensor resides).

According to some implementations, block 236 involves an authentication process based, at least in part, on the first and second fingerprint images obtained in blocks 232 and 234, respectively. As an example, block 236 may involve comparing a first fingerprint image (e.g., an image of residue obtained in block 232) with a second fingerprint image (e.g., an image of a purported target object, such as a finger, obtained in block 234). The authentication process of block 236 may involve determining whether or not the second fingerprint image closely matches the first fingerprint image (e.g., using a relatively strict co-relation test, of the type described herein in connection with at least FIG. 2A). When the authentication process of block 236 determines that the second fingerprint image closely matches the first fingerprint image, the authentication process fails (as a potential spoofing attempt).

According to some implementations, block 236 may also involve an authentication process based, at least in part, on the second fingerprint image and on previously-authenticated fingerprint data. In particular and assuming that the second fingerprint image is not found to closely match the first fingerprint image, block 236 may involve determining whether the second fingerprint image matches the previously-authenticated fingerprint data under a relatively lenient co-relation test (of the type described herein in connection with at least FIG. 2A). When the second fingerprint fails to match the first fingerprint under the strict co-relation test but does match the previously-authenticated fingerprint data under the lenient co-relation test, the second fingerprint may be accepted or authenticated as legitimate.

According to the example of FIG. 2C, the method 240 is a method of controlling an apparatus that includes a fingerprint sensor. According to this implementation, block 242 involves controlling (e.g., via a control system of the apparatus, such as the control system 106 of the apparatus 101 that is shown in FIG. 1B) the fingerprint sensor for obtaining a fingerprint image. The fingerprint image may be an image of residual material on a surface of the fingerprint sensor (or a surface of a device proximate the area in which the fingerprint sensor resides). Thus, the fingerprint image may be an image of a latent fingerprint.

According to some implementations, block 244 involves providing, based on the fingerprint image obtained in block 242, a notification, alert, message, or the like that informs a user, operator, or other person that the surface of the fingerprint sensor (or the surface of the device proximate the area in which the fingerprint sensor resides) is dirty and/or should be cleaned. As an example, the notification of block 244 may be based on a determination that the fingerprint image obtained in block 242 has an image quality (IQ) metric above one or more thresholds (e.g., in a manner similar to that disclosed in connection with block 209 of FIG. 2A). In other words, the notification of block 244 may be based on a determination that a latent fingerprint was left on the relevant surface and that the latent fingerprint had sufficient quality to potentially be usable in a spoofing attempt.

Figure 2D:
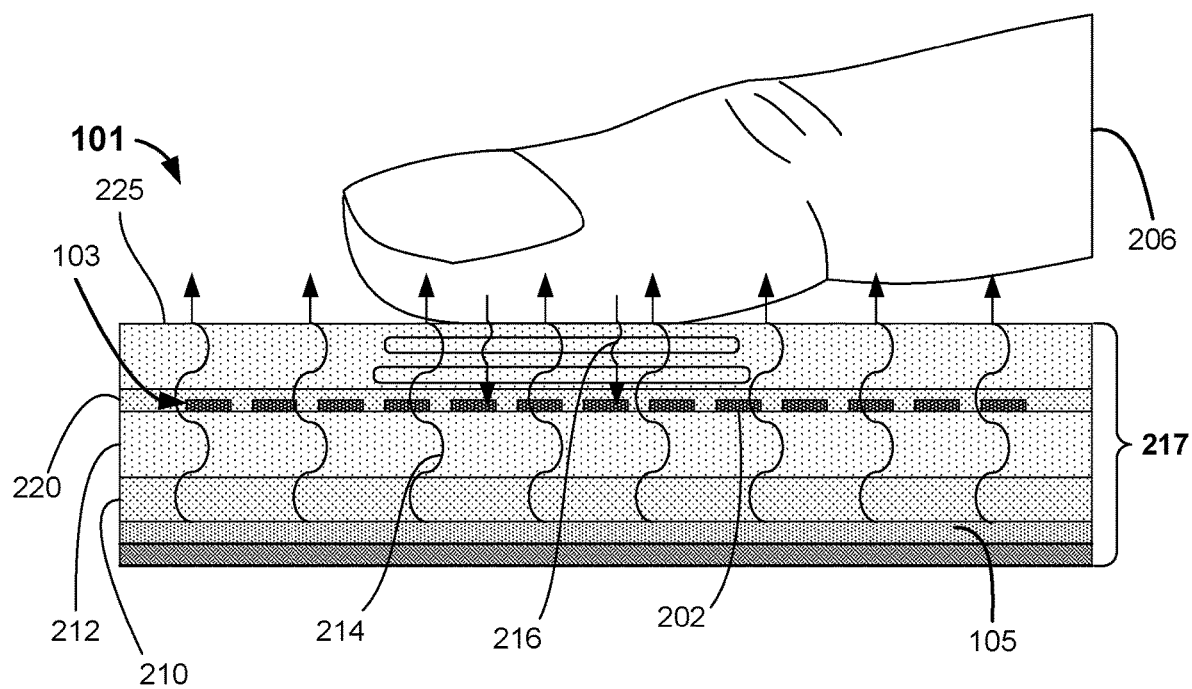
FIG. 2D shows an example of a cross-sectional view of an apparatus capable of performing at least some methods that are described herein.

FIG. 2D shows an example of a cross-sectional view of an apparatus capable of performing at least some methods that are described herein. For example, the apparatus 101 may be capable of performing the methods that are described herein with reference to FIGS. 2A, 2B, and 2C. Here, the apparatus 101 is an example of the apparatus 101 that is described above with reference to FIG. 1B. As with other implementations shown and described herein, the types of elements, the arrangement of the elements and the dimensions of the elements illustrated in FIG. 2D are merely shown by way of example.

FIG. 2D shows an example of ultrasonic waves reflecting from a target object. In this example, the target object is a finger 206 being insonified by transmitted ultrasonic waves 214. In this example, the transmitted ultrasonic waves 214 are instances of ultrasonic waves that may be transmitted as part of obtaining fingerprint images in blocks 203, 207, and 213 of FIG. 2A; as part of obtaining fingerprint images in blocks 232 and 234 of FIG. 2B; and as part of obtaining a fingerprint image in block 242 of FIG. 2C. Here, the reflected ultrasonic waves 216 that are received by at least a portion of the ultrasonic receiver 103 are instances of the reflections of ultrasonic waves that may be received as part of obtaining fingerprint images in blocks 203, 207, and 213 of FIG. 2A; as part of obtaining fingerprint images in blocks 232 and 234 of FIG. 2B; and as part of obtaining a fingerprint image in block 242 of FIG. 2C.

In this example, the ultrasonic waves are transmitted by an ultrasonic transmitter 105 that is separate from the ultrasonic receiver 103. In the example shown in FIG. 2D, at least a portion of the apparatus 101 includes an ultrasonic transmitter 105 that may function as a plane-wave ultrasonic transmitter. In some implementations, the ultrasonic transmitter 105 may include a piezoelectric transmitter layer with transmitter excitation electrodes disposed on each side of the piezoelectric transmitter layer.

In this example, the ultrasonic receiver 103 functions as an ultrasonic receiver array. In some such examples, the ultrasonic receiver 103 may include an array of pixel input electrodes and sensor pixels formed in part from TFT circuitry, an overlying piezoelectric receiver layer 220 of piezoelectric material such as PVDF or PVDF-TrFE, and an upper electrode layer positioned on the piezoelectric receiver layer, which will sometimes be referred to herein as a receiver bias electrode. Examples of suitable ultrasonic transmitters and ultrasonic receiver arrays are described below.

However, in alternative implementations, the ultrasonic receiver 103 and the ultrasonic transmitter 105 may be combined in an ultrasonic transceiver array. For example, in some implementations, the ultrasonic receiver 103 may include a piezoelectric receiver layer, such as a layer of PVDF polymer or a layer of PVDF-TrFE copolymer. In some implementations, a separate piezoelectric layer may serve as the ultrasonic transmitter. In some examples, a single piezoelectric layer may serve as the transmitter and as a receiver. In some implementations, other piezoelectric materials may be used in the piezoelectric layer, such as aluminum nitride (AlN) or lead zirconate titanate (PZT). The ultrasonic sensor 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, a piezoelectric receiver layer, PMUT elements in a single-layer array of PMUTs, or CMUT elements in a single-layer array of CMUTs, may be used as ultrasonic transmitters as well as ultrasonic receivers.

In this example, the transmitted ultrasonic waves 214 have been transmitted from the ultrasonic transmitter 105 through a sensor stack 217 and into an overlying finger 206. The various layers of the sensor stack 217 may, in some examples, include one or more substrates of glass or other material (such as plastic or sapphire) that is substantially transparent to visible light. In this example, the sensor stack 217 includes a substrate 210 to which a light source system (not shown) is coupled, which may be a backlight of a display according to some implementations. In alternative implementations, a light source system may be coupled to a front light. Accordingly, in some implementations a light source system may be configured for illuminating a display and the target object.

In this implementation, the substrate 210 is coupled to a thin-film transistor (TFT) substrate 212 for the ultrasonic receiver 103. According to this example, a piezoelectric receiver layer 220 overlies the sensor pixels 202 of the ultrasonic receiver 103 and a platen 225 overlies the piezoelectric receiver layer 220. Accordingly, in this example the apparatus 101 is capable of transmitting the ultrasonic waves 214 through one or more substrates of the sensor stack 217 that include the ultrasonic receiver 103 with substrate 212 and the platen 225 that may also be viewed as a substrate.

In some implementations, sensor pixels 202 may be transparent, partially transparent or substantially transparent, such that the apparatus 101 may be capable of transmitting light from a light source system through elements of the ultrasonic receiver 103. In some implementations, the ultrasonic receiver 103 and associated circuitry may be formed on or in a glass, plastic or silicon substrate.

Referring again to FIGS. 2A, 2B, and 2C, in some implementations methods 200, 230, and/or 240 may involve performing an anti-spoofing process. According to some implementations, methods 200, 230, and 240 may involve additional processes that depend on the outcome of one or more of the authentication processes of blocks 205, 215, and 236 and/or the anti-spoofing process, if any. For example, if the authentication process and/or the anti-spoofing process (if any) conclude successfully, a control system may allow access to a device and/or to a secure area. In some such instances, a control system may unlock a mobile device, a laptop computer, a door, an automobile, or another device.

Figure 3A:
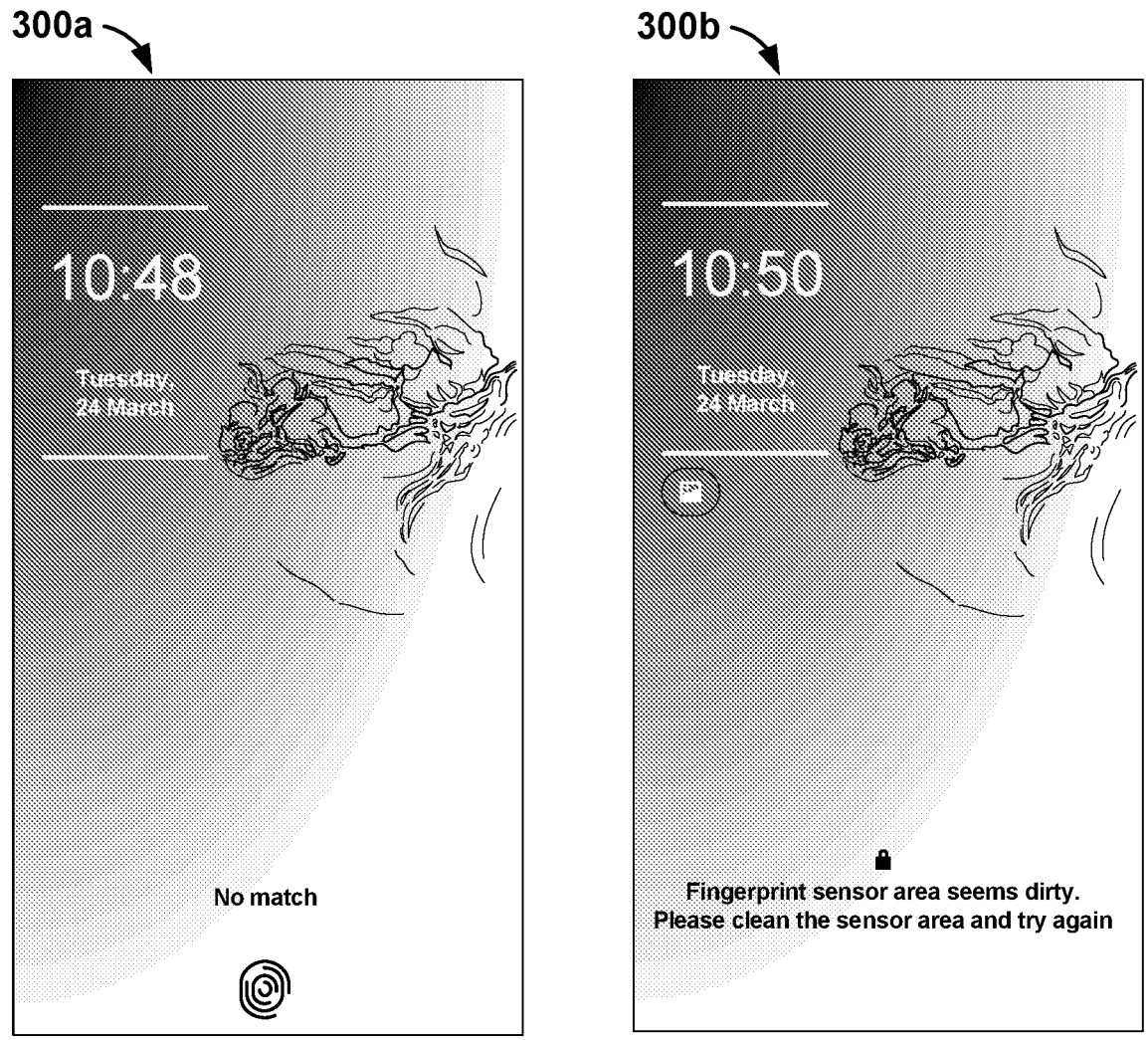
FIGS. 3A and 3B show examples of graphical user interfaces following detection of a latent fingerprint.
Figure 3B:
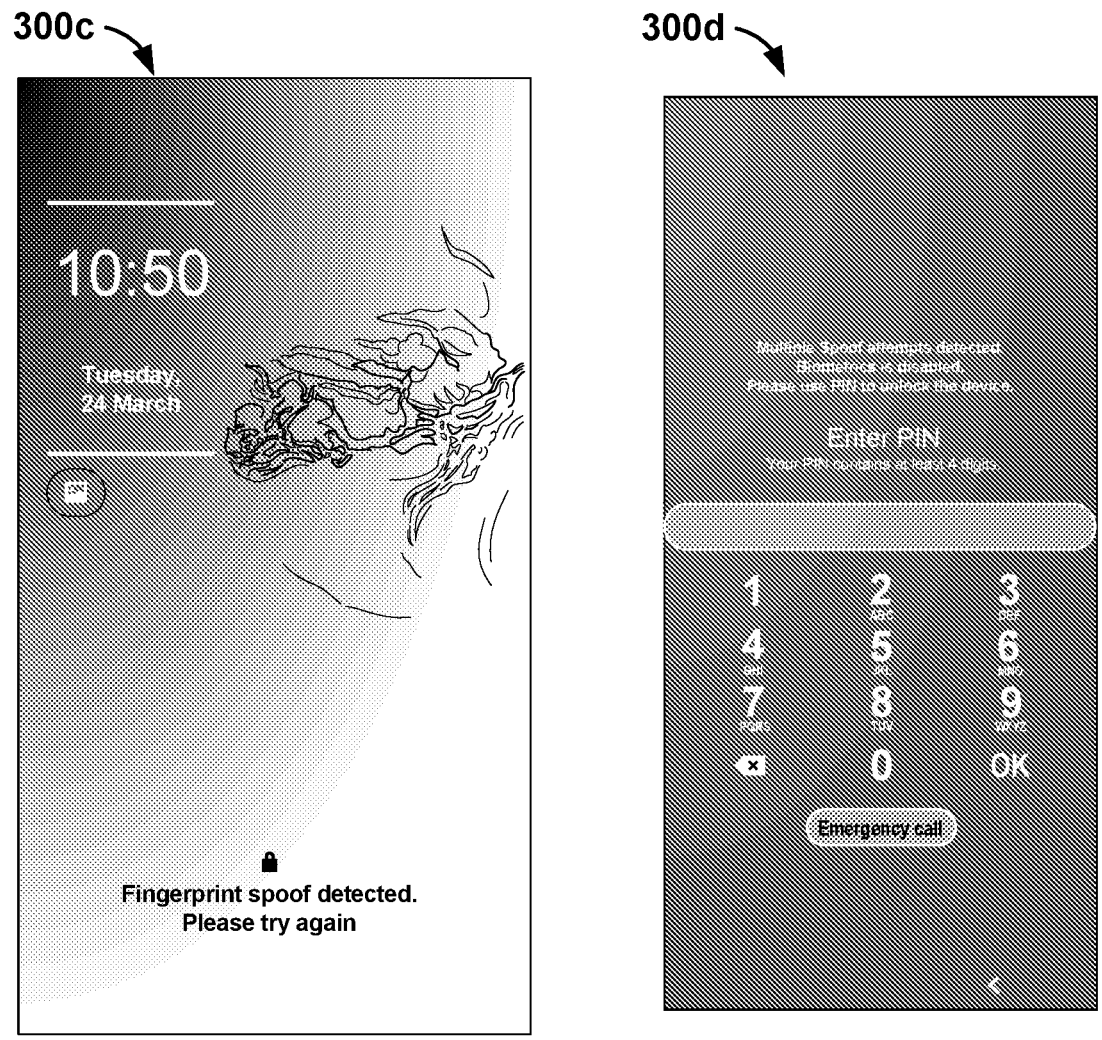

FIGS. 3A and 3B show examples of graphical user interfaces (GUIs) for providing feedback to users upon detection of a latent fingerprint. In each of these examples, the fingerprint sensor had detected and stored a latent fingerprint (e.g., executed blocks 207, 209, and 211, executed block 232, and/or executed block 242) and/or a user has attempted to use the fingerprint sensor for an authentication (e.g., executed blocks 213 and 215 and/or executed block 234). The GUIs of FIGS. 3A and 3B may be presented following rejections of the authentication process of block 215 (e.g., determinations that the freshly scanned fingerprint is a potential spoofing attempt based on similarity to the stored latent fingerprint), rejections of the authentication process of block 236, and/or as part of providing the notification of block 244. As shown in the example of GUI 300a, the apparatus may indicate "No match" (or the like) to a user. As shown in the example of GUI 300b, the apparatus may notify the user that the fingerprint sensor area seems dirty (or the like) and suggest that the user clear the sensor area and try again. As shown in the example of GUI 300c, the apparatus may notify the user that a fingerprint spoof was detected and ask the user to please try again. As shown in the example of GUI 300d, the apparatus may notify the user that multiple spoof attempts have been detected, that biometrics is now disabled, and to please use their PIN to unlock the device. These are merely illustrative examples.

Figure 4:
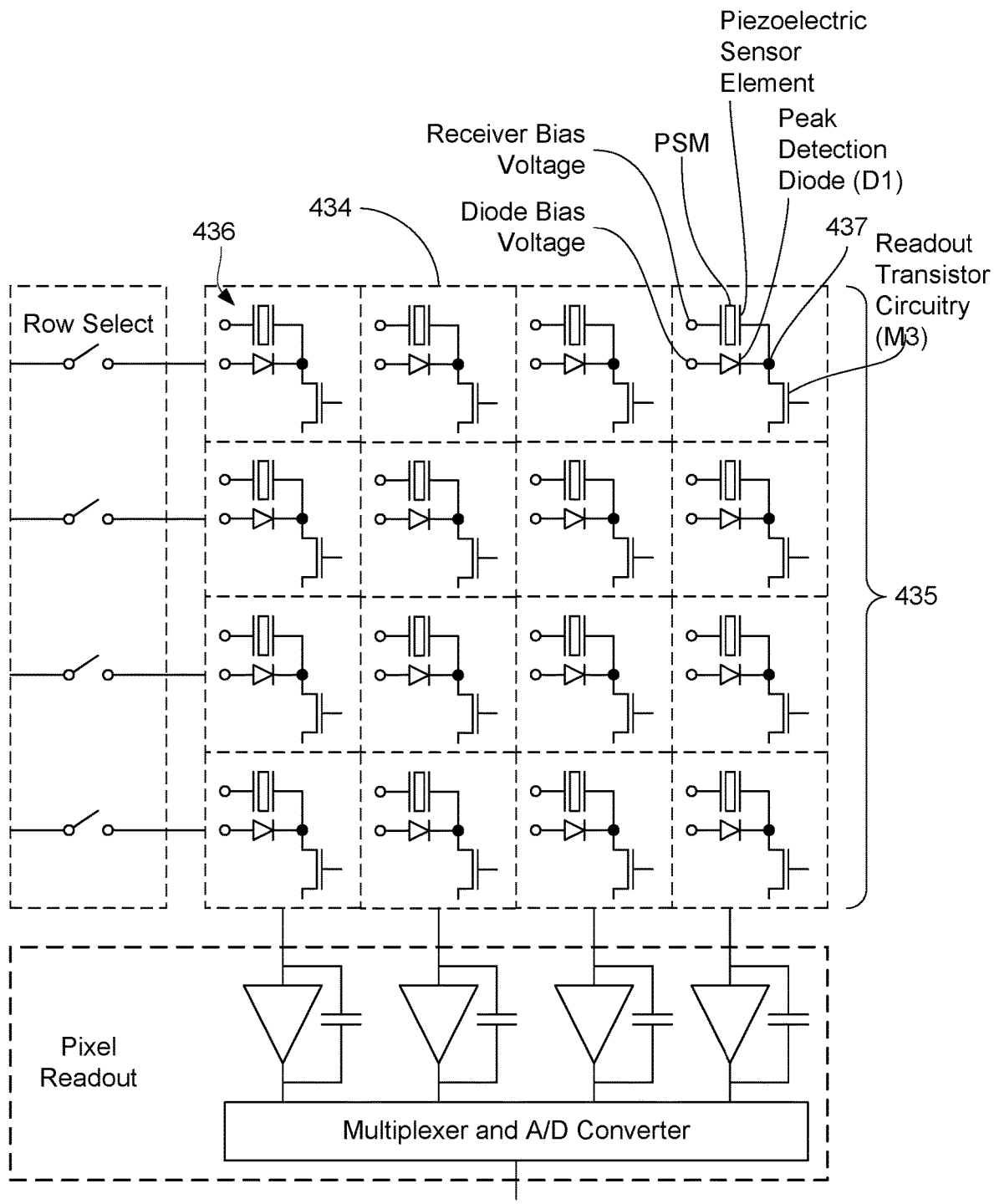
FIG. 4 representationally depicts aspects of a 4×4 pixel array of sensor pixels for an ultrasonic fingerprint sensor.

FIG. 4 representationally depicts aspects of a 4×4 pixel array of sensor pixels for an ultrasonic fingerprint sensor. Each sensor pixel 434 may be, for example, associated with a local region of piezoelectric sensor material (PSM), a pixel input electrode 437, a peak detection diode (D1) and a readout transistor circuitry (M3); many or all of these elements may be formed on or in a substrate to form the pixel circuit 436. In practice, the local region of piezoelectric sensor material of each sensor pixel 434 may transduce received ultrasonic energy into electrical charges. The peak detection diode D1 may register the maximum amount of charge detected by the local region of piezoelectric sensor material PSM. Each row of the pixel array 435 may then be scanned, e.g., through a row select mechanism, a gate driver, or a shift register, and the readout transistor circuitry M3 for each column may be triggered to allow the magnitude of the peak charge for each sensor pixel 434 to be read by additional circuitry, e.g., a multiplexer and an A/D converter. The pixel circuit 436 may include one or more TFTs to allow gating, addressing, and resetting of the sensor pixel 434.

Each pixel circuit 436 may provide information about a small portion of the object detected by the ultrasonic fingerprint sensor. While, for convenience of illustration, the example shown in FIG. 4 is of a relatively coarse resolution, ultrasonic sensors having a resolution on the order of 500 pixels per inch or higher may be configured with an appropriately scaled structure. The detection area of the ultrasonic fingerprint sensor may be selected depending on the intended object of detection. For example, the detection area may range from about 8 mm×3 mm, 5 mm×5 mm or 9 mm×4 mm for a single finger to about 3 inches×3 inches for four fingers. Smaller and larger areas, including square, rectangular and non-rectangular geometries, may be used as appropriate for the target object.

Figure 5A:
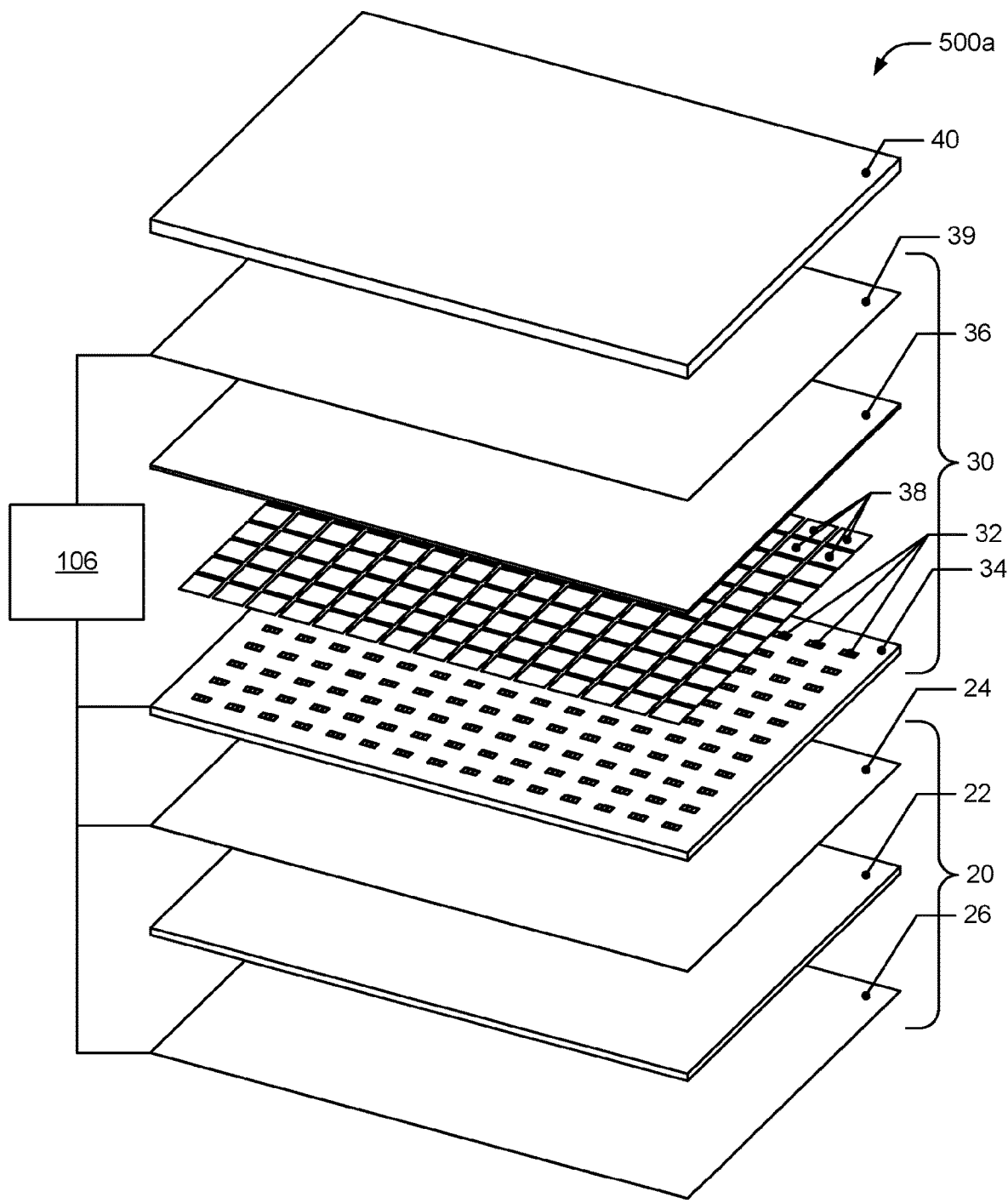
FIGS. 5A and 5B show example arrangements of ultrasonic transmitters and receivers in an ultrasonic fingerprint sensor, with other arrangements being possible.

FIG. 5A shows an example of an exploded view of an ultrasonic fingerprint sensor. In this example, the ultrasonic fingerprint sensor 500a includes an ultrasonic transmitter 20 and an ultrasonic receiver 30 under a platen 40. According to some implementations, the ultrasonic receiver 30 may be an example of the ultrasonic receiver 103 that is shown in FIG. 1B and described above. In some implementations, the ultrasonic transmitter 20 may be an example of the ultrasonic transmitter 105 that is shown in FIG. 1B and described above. The ultrasonic transmitter 20 may include a substantially planar piezoelectric transmitter layer 22 and may be configured for functioning as a plane wave generator. Ultrasonic waves may be generated by applying a voltage to the piezoelectric layer to expand or contract the layer, depending upon the signal applied, thereby generating a plane wave. In this example, the control system 106 may be configured for causing a voltage that may be applied to the planar piezoelectric transmitter layer 22 via a first transmitter electrode 24 and a second transmitter electrode 26. In this fashion, an ultrasonic wave may be made by changing the thickness of the layer via a piezoelectric effect. This generated ultrasonic wave may travel towards a finger (or other object to be detected), passing through the platen 40. A portion of the wave not absorbed or transmitted by the object to be detected may be reflected so as to pass back through the platen 40 and be received by the ultrasonic receiver 30. The first and second transmitter electrodes 24 and 26 may be metallized electrodes, for example, metal layers that coat opposing sides of the piezoelectric transmitter layer 22.

The ultrasonic receiver 30 may include an array of sensor pixel circuits 32 disposed on a substrate 34, which also may be referred to as a backplane, and a piezoelectric receiver layer 36. In some implementations, each sensor pixel circuit 32 may include one or more TFT- or silicon-based elements, electrical interconnect traces and, in some implementations, one or more additional circuit elements such as diodes, capacitors, and the like. Each sensor pixel circuit 32 may be configured to convert surface charge generated by the piezoelectric receiver layer 36 proximate to the pixel circuit into an electrical signal. Each sensor pixel circuit 32 may include a pixel input electrode 38 that electrically couples the piezoelectric receiver layer 36 to the sensor pixel circuit 32.

In the illustrated implementation, a receiver bias electrode 39 is disposed on a side of the piezoelectric receiver layer 36 proximal to platen 40. The receiver bias electrode 39 may be a metallized electrode and may be grounded or biased to control which signals may be passed to the array of sensor pixel circuits 32. Ultrasonic energy that is reflected from the exposed (top) surface of the platen 40 may be converted into surface charge by the piezoelectric receiver layer 36. The generated surface charge may be coupled to the pixel input electrodes 38 and underlying sensor pixel circuits 32. The charge signal may be amplified or buffered by the sensor pixel circuits 32 and provided to the control system 106.

The control system 106 may be electrically connected (directly or indirectly) with the first transmitter electrode 24 and the second transmitter electrode 26, as well as with the receiver bias electrode 39 and the sensor pixel circuits 32 on the substrate 34. In some implementations, the control system 106 may operate substantially as described above. For example, the control system 106 may be configured for processing the amplified signals received from the sensor pixel circuits 32.

The control system 106 may be configured for controlling the ultrasonic transmitter 20 and/or the ultrasonic receiver 30 to obtain ultrasonic data, which may include fingerprint data. According to some implementations, the control system 106 may be configured for providing functionality such as that described herein.

Whether or not the ultrasonic fingerprint sensor 500a includes a separate ultrasonic transmitter 20, in some implementations the control system 106 may be configured for obtaining attribute information from the ultrasonic data. In some examples, the control system 106 may be configured for controlling access to one or more devices based, at least in part, on the attribute information. The ultrasonic fingerprint sensor 500a (or an associated device) may include a memory system that includes one or more memory devices. In some implementations, the control system 106 may include at least a portion of the memory system. The control system 106 may be configured for obtaining attribute information from ultrasonic data and storing the attribute information in the memory system. In some implementations, the control system 106 may be configured for capturing a fingerprint image, obtaining attribute information from the fingerprint image and storing attribute information obtained from the fingerprint image (which may be referred to herein as fingerprint image information) in the memory system. According to some examples, the control system 106 may be configured for capturing a fingerprint image, obtaining attribute information from the fingerprint image and storing attribute information obtained from the fingerprint image even while maintaining the ultrasonic transmitter 20 in an "off" state.

In some implementations, the control system 106 may be configured for operating the ultrasonic fingerprint sensor 500a in an ultrasonic imaging mode and may be configured for controlling other devices, such as a display system, a communication system, etc. In some implementations, the control system 106 may be configured for operating the ultrasonic fingerprint sensor 500a in a capacitive imaging mode.

The platen 40 may be any appropriate material that can be acoustically coupled to the receiver, with examples including plastic, ceramic, sapphire, metal and glass. In some implementations, the platen 40 may be a cover plate, e.g., a cover glass or a lens glass for a display. Particularly when the ultrasonic transmitter 20 is in use, fingerprint detection and imaging can be performed through relatively thick platens if desired, e.g., 3 mm and above. However, for implementations in which the ultrasonic receiver 30 is configured for imaging fingerprints in a capacitance detection mode, a thinner and relatively more compliant platen 40 may be desirable. According to some such implementations, the platen 40 may include one or more polymers, such as one or more types of parylene, and may be substantially thinner. In some such implementations, the platen 40 may be tens of microns thick or even less than 10 microns thick.

Examples of piezoelectric materials that may be used to form the piezoelectric receiver layer 36 include piezoelectric polymers having appropriate acoustic properties, for example, an acoustic impedance between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be employed include polyvinylidene chloride (PVDC) homopolymers and copolymers, polytetrafluoroethylene (PTFE) homopolymers and copolymers, and diisopropylammonium bromide (DIPAB).

The thickness of each of the piezoelectric transmitter layer 22 and the piezoelectric receiver layer 36 may be selected so as to be suitable for generating and receiving ultrasonic waves. In one example, a PVDF planar piezoelectric transmitter layer 22 is approximately 28 µm thick and a PVDF-TrFE receiver layer 36 is approximately 12 µm thick. Example frequencies of the ultrasonic waves may be in the range of 5 MHz to 30 MHz, with wavelengths on the order of a millimeter or less.

Figure 5B:
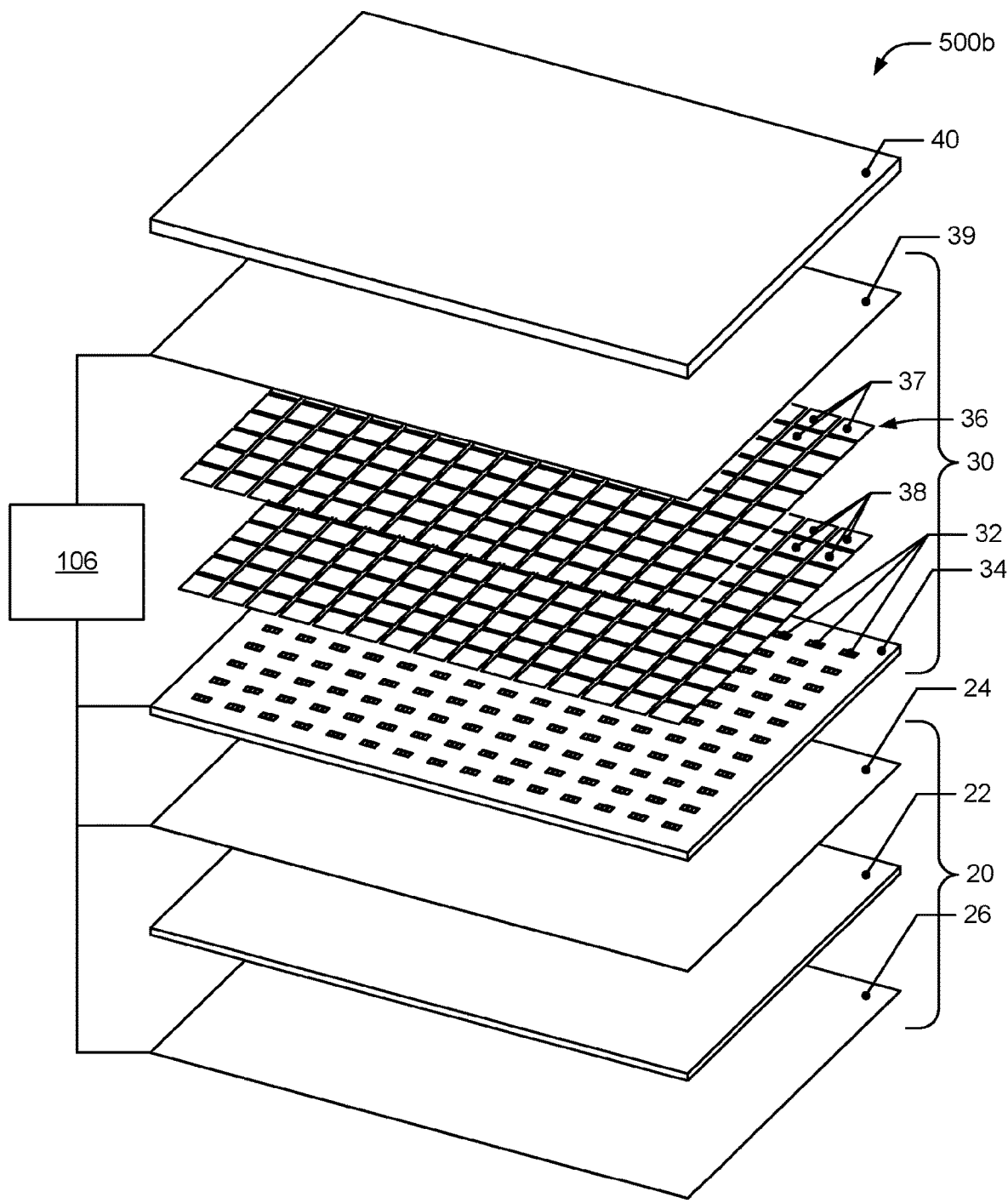

FIG. 5B shows an exploded view of an alternative example of an ultrasonic fingerprint sensor. In this example, the piezoelectric receiver layer 36 has been formed into discrete elements 37. In the implementation shown in FIG. 5B, each of the discrete elements 37 corresponds with a single pixel input electrode 38 and a single sensor pixel circuit 32. However, in alternative implementations of the ultrasonic fingerprint sensor 500b, there is not necessarily a one-to-one correspondence between each of the discrete elements 37, a single pixel input electrode 38 and a single sensor pixel circuit 32. For example, in some implementations there may be multiple pixel input electrodes 38 and sensor pixel circuits 32 for a single discrete element 37.

FIGS. 5A and 5B show example arrangements of ultrasonic transmitters and receivers in an ultrasonic fingerprint sensor, with other arrangements being possible. For example, in some implementations, the ultrasonic transmitter 20 may be above the ultrasonic receiver 30 and therefore closer to the object(s) to be detected. In some implementations, the ultrasonic transmitter may be included with the ultrasonic sensor array (e.g., a single-layer transmitter and receiver). In some implementations, the ultrasonic fingerprint sensor may include an acoustic delay layer. For example, an acoustic delay layer may be incorporated into the ultrasonic fingerprint sensor between the ultrasonic transmitter 20 and the ultrasonic receiver 30. An acoustic delay layer may be employed to adjust the ultrasonic pulse timing, and at the same time electrically insulate the ultrasonic receiver 30 from the ultrasonic transmitter 20. The acoustic delay layer may have a substantially uniform thickness, with the material used for the delay layer and/or the thickness of the delay layer selected to provide a desired delay in the time for reflected ultrasonic energy to reach the ultrasonic receiver 30. In doing so, the range of time during which an energy pulse that carries information about the object by virtue of having been reflected by the object may be made to arrive at the ultrasonic receiver 30 during a time range when it is unlikely that energy reflected from other parts of the ultrasonic fingerprint sensor is arriving at the ultrasonic receiver 30. In some implementations, the substrate 34 and/or the platen 40 may serve as an acoustic delay layer.

Figure 5C:
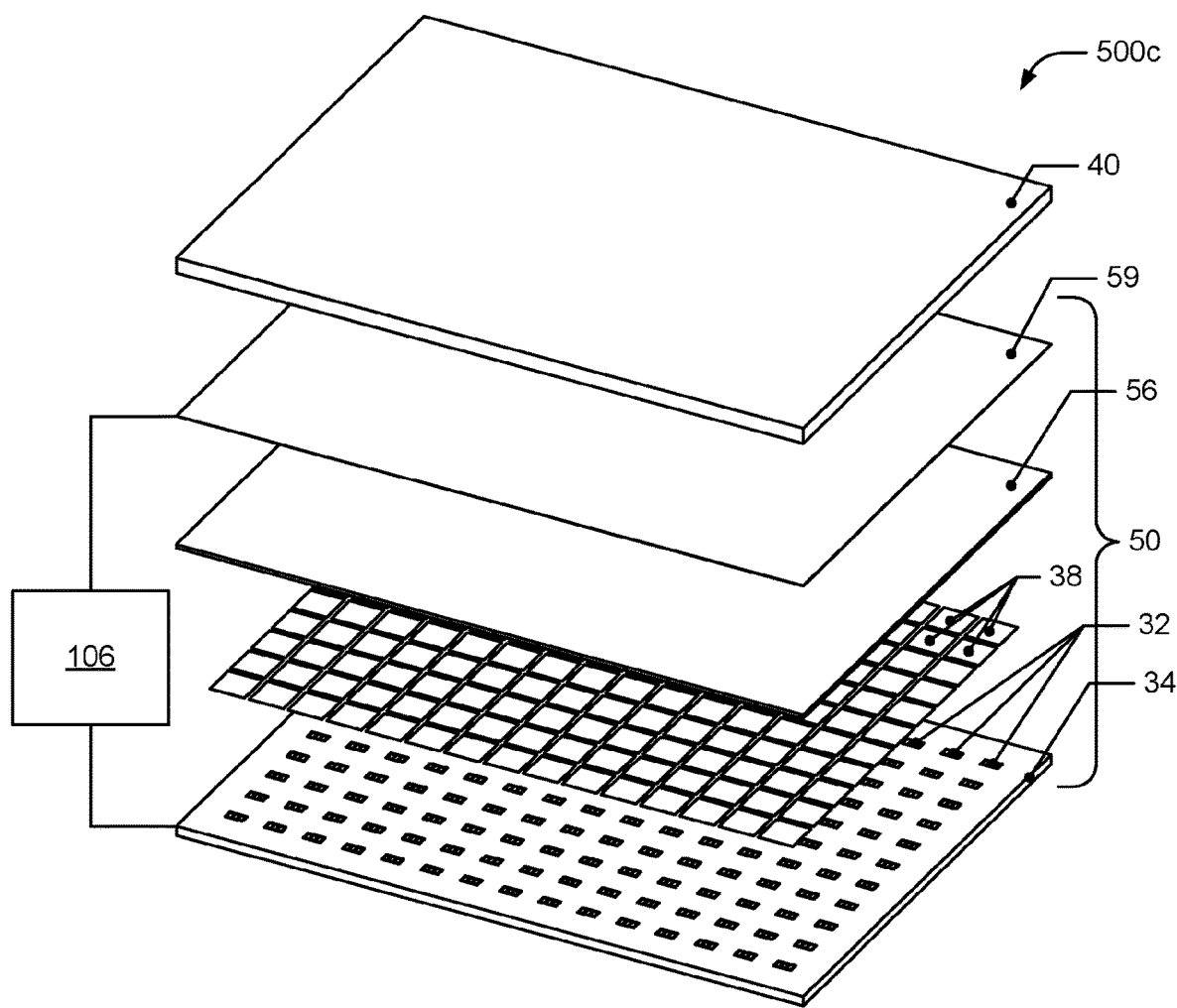
FIG. 5C shows an example of an ultrasonic transceiver array in an ultrasonic fingerprint sensor.

FIG. 5C shows an exploded view of an example of an ultrasonic fingerprint sensor. In this example, the ultrasonic fingerprint sensor 500c includes an ultrasonic transceiver array 50 under a platen 40. According to some implementations, the ultrasonic transceiver array 50 may serve as both the ultrasonic receiver 103 and the ultrasonic transmitter 105 that is shown in FIG. 1B and described above. The ultrasonic transceiver array 50 may include a substantially planar piezoelectric transceiver layer 56 configured for functioning as a plane wave generator. Ultrasonic waves may be generated by applying a voltage across the transceiver layer 56. The control system 106 may be configured for generating a transceiver excitation voltage that may be applied to the piezoelectric transceiver layer 56 via one or more underlying pixel input electrodes 38 or one or more overlying transceiver bias electrodes 59. The generated ultrasonic wave may travel towards a finger or other object to be detected, passing through the platen 40. A portion of the wave not absorbed or transmitted by the object may be reflected so as to pass back through the platen 40 and be received by the ultrasonic transceiver array 50.

The ultrasonic transceiver array 50 may include an array of sensor pixel circuits 32 disposed on a substrate 34. In some implementations, each sensor pixel circuit 32 may include one or more TFT- or silicon-based elements, electrical interconnect traces and, in some implementations, one or more additional circuit elements such as diodes, capacitors, and the like. Each sensor pixel circuit 32 may include a pixel input electrode 38 that electrically couples the piezoelectric transceiver layer 56 to the sensor pixel circuit 32.

In the illustrated implementation, the transceiver bias electrode 59 is disposed on a side of the piezoelectric transceiver layer 56 proximal to the platen 40. The transceiver bias electrode 59 may be a metallized electrode and may be grounded or biased to control which signals may be generated and which reflected signals may be passed to the array of sensor pixel circuits 32. Ultrasonic energy that is reflected from the exposed (top) surface of the platen 40 may be converted into surface charge by the piezoelectric transceiver layer 56. The generated surface charge may be coupled to the pixel input electrodes 38 and underlying sensor pixel circuits 32. The charge signal may be amplified or buffered by the sensor pixel circuits 32 and provided to the control system 106.

The control system 106 may be electrically connected (directly or indirectly) to the transceiver bias electrode 59 and the sensor pixel circuits 32 on the sensor substrate 34. In some implementations, the control system 106 may operate substantially as described above. For example, the control system 106 may be configured for processing the amplified signals received from the sensor pixel circuits 32.

The control system 106 may be configured for controlling the ultrasonic transceiver array 50 to obtain ultrasonic data, which may include fingerprint data. According to some implementations, the control system 106 may be configured for providing functionality such as that described herein, e.g., such as described herein.

In other examples of an ultrasonic fingerprint sensor with an ultrasonic transceiver array, a backside of the sensor substrate 34 may be attached directly or indirectly to an overlying platen 40. In operation, ultrasonic waves generated by the piezoelectric transceiver layer 56 may travel through the sensor substrate 34 and the platen 40, reflect off a surface of the platen 40, and travel back through the platen 40 and the sensor substrate 34 before being detected by sensor pixel circuits 32 on or in the substrate sensor 34.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

Implementation examples are described in the following numbered clauses:

1. An apparatus, comprising: a fingerprint sensor; and a control system configured for: receiving first signals from the fingerprint sensor, the first signals including signals corresponding to residual material; receiving second signals from the fingerprint sensor, the second signals including signals corresponding to at least a target object; and performing an authentication process based, at least in part, on the first signals and the second signals.

2. The apparatus of clause 1, wherein the fingerprint sensor comprises an ultrasonic fingerprint sensor, wherein the first signals comprise first ultrasonic receiver signals including signals corresponding to reflections of first ultrasonic waves from the residual material on the surface, and wherein the second signals comprise second ultrasonic receiver signals including signals corresponding to at least the target object.

3. The apparatus of clause 1 or clause 2, wherein the residual material is on a surface, the surface being a fingerprint sensor surface or a surface of a device proximate an area in which the fingerprint sensor resides and wherein the target object is in contact with or adjacent to the surface.

4. The apparatus of any of clauses 1-3, wherein performing the authentication process based, at least in part, on the first signals and the second signals involves determining that the first signals form a fingerprint image with an image quality (IQ) metric above one or more thresholds.

5. The apparatus of clause 4, further comprising a display, wherein the control system is further capable of controlling the display to provide a prompt to clean a portion of the fingerprint sensor after determining that the first signals form the fingerprint image with the IQ metric above the one or more thresholds.

6. The apparatus of any of clauses 1-5, wherein performing the authentication process based, at least in part, on the first signals and the second signals involves determining the residual material forms a latent fingerprint by determining that the first signals form a fingerprint image.

7. The apparatus of any of clauses 1-6, wherein performing the authentication process based, at least in part, on the first signals and the second signals involves: comparing a first fingerprint image based on the first signals with a second fingerprint image based on the second signals, determining that the first and second fingerprint images satisfy a correlation test, and based on determining that the first and second fingerprint images satisfy the correlation test, rejecting authentication of the target object.

7A. The apparatus of clause 7, wherein the apparatus comprises at least one of a display or a speaker and wherein the control system is further configured for controlling at least one of the display or the speaker to provide a prompt to enter a personal identification code.

8. The apparatus of any of clauses 1-7, wherein performing the authentication process based, at least in part, on the first signals and the second signals involves: comparing a first fingerprint image based on the first signals with a second fingerprint image based on the second signals, determining that the first and second fingerprint images fail a first correlation test requiring a first level of correlation, retrieving a third fingerprint image from a storage device in the apparatus, the third fingerprint image representing a previously-authenticated fingerprint, determining that the second and third fingerprint images satisfy a second correlation test requiring a second level of correlation, the second level of correlation being less than the first level of correlation, and based on determining that the second and third fingerprint images satisfy the second correlation test, authenticating the target object.

9. The apparatus of clause 8, wherein the first correlation test limits relative rotation between the first and second fingerprint images to being less than 10 degrees of rotation.

10. The apparatus of clause 8, wherein the first correlation test limits relative rotation between the first and second fingerprint images to being less than 10 degrees of rotation and wherein the second correlation test allows relative rotation between the second and third fingerprint images to be greater than 30 degrees of rotation.

11. The apparatus of clause 8, wherein the first correlation test limits relative translation between the first and second fingerprint images to being less than a threshold amount and wherein the second correlation test allows relative translation between the second and third fingerprint to be greater than the threshold amount.

12. The apparatus of any of clauses 1-11, wherein the control system is further configured for: receiving third signals from the fingerprint sensor, the third signals including signals corresponding to at least the target object or at least an additional target object, wherein the control system is configured to receive the third signals before receiving the first signals and before receiving the second signals; retrieving an authenticated fingerprint image from a storage device in the apparatus; and authenticating the target object or the additional target object based on a comparison of the authenticated fingerprint image with the third signals.

13. The apparatus of clause 12, wherein the control system is further configured for controlling the fingerprint sensor so that receiving the first signals occurs temporally after and is at least partly triggered by the authentication of the target object or the additional target object based on the comparison of the authenticated fingerprint image with the third signals.

14. The apparatus of any of clauses 1-13, wherein the apparatus comprises a mobile device that includes the fingerprint sensor and the control system.

15. A method of controlling a fingerprint sensor, the method comprising: receiving first signals from the sensor, the first signals including signals corresponding to residual material deposited on a surface, the surface being a fingerprint sensor surface or a surface of a device proximate an area in which the fingerprint sensor resides; and controlling at least one of a display or a speaker to provide a prompt, based on the first signals, to clean the surface.

16. The method of clause 15, wherein a mobile device includes the sensor and at least one of the display or the speaker.

17. An apparatus, comprising: a fingerprint sensor; and a control system configured for: receiving first signals from the fingerprint sensor; receiving second signals from the fingerprint sensor; comparing a first fingerprint image based on the first signals with a second fingerprint image based on the second signals; determining that the first and second fingerprint images satisfy a correlation test; and based on determining that the first and second fingerprint images satisfy the correlation test, rejecting authentication based on the second signals.

18. The apparatus of clause 17, wherein the apparatus comprises a mobile device that includes the fingerprint sensor and the control system.

19. The apparatus of clause 17, wherein the first fingerprint image is an image of residue, the residue formed at least in part by an object previously authenticated by the apparatus.

19A. The apparatus of clause 17, wherein the apparatus comprises at least one of a display or a speaker and wherein the control system is further configured for controlling at least one of the display or the speaker to provide a prompt to enter a personal identification code.

The invention claimed is:
1. An apparatus, comprising:
a fingerprint sensor;
a display; and
a control system configured for:
receiving first signals from the fingerprint sensor, the first signals including signals corresponding to residual material on a surface, the surface being a surface of the fingerprint sensor or a surface of a device proximate an area in which the fingerprint sensor resides and wherein a target object is in contact with or adjacent to the surface;
receiving second signals from the fingerprint sensor, the second signals including signals corresponding to at least the target object;
performing an authentication process based, at least in part, on the first signals and the second signals, wherein performing the authentication process involves determining that the first signals form a fingerprint image having an image quality (IQ) metric above one or more thresholds; and controlling the display to provide a prompt to clean a portion of the surface responsive to determining that the first signals that form the fingerprint image have the IQ metric above the one or more thresholds.

2. The apparatus of claim 1, wherein the fingerprint sensor comprises an ultrasonic fingerprint sensor, wherein the first signals comprise first ultrasonic receiver signals including signals corresponding to reflections of first ultrasonic waves from the residual material on the surface, and wherein the second signals comprise second ultrasonic receiver signals including signals corresponding to at least the target object.

3. The apparatus of claim 1, wherein performing the authentication process based, at least in part, on the first signals and the second signals involves determining the residual material forms a latent fingerprint by determining that the first signals form a fingerprint image.

4. The apparatus of claim 1, wherein performing the authentication process based, at least in part, on the first signals and the second signals involves:
comparing a first fingerprint image based on the first signals with a second fingerprint image based on the second signals,
determining that the first and second fingerprint images satisfy a correlation test, and
based on determining that the first and second fingerprint images satisfy the correlation test, rejecting authentication of the target object.

5. The apparatus of claim 1, wherein performing the authentication process based, at least in part, on the first signals and the second signals involves:
comparing a first fingerprint image based on the first signals with a second fingerprint image based on the second signals,
determining that the first and second fingerprint images fail a first correlation test requiring a first level of correlation,
retrieving a third fingerprint image from a storage device in the apparatus, the third fingerprint image representing a previously-authenticated fingerprint,
determining that the second and third fingerprint images satisfy a second correlation test requiring a second level of correlation, the second level of correlation being less than the first level of correlation, and
based on determining that the second and third fingerprint images satisfy the second correlation test, authenticating the target object.

6. The apparatus of claim 5, wherein the first correlation test limits relative rotation between the first and second fingerprint images to being less than 10 degrees of rotation.

7. The apparatus of claim 5, wherein the first correlation test limits relative rotation between the first and second fingerprint images to being less than 10 degrees of rotation and wherein the second correlation test allows relative rotation between the second and third fingerprint images to be greater than 30 degrees of rotation.

8. The apparatus of claim 5, wherein the first correlation test limits relative translation between the first and second fingerprint images to being less than a threshold amount and wherein the second correlation test allows relative translation between the second and third fingerprint to be greater than the threshold amount.

9. The apparatus of claim 1, wherein the control system is further configured for:
receiving third signals from the fingerprint sensor, the third signals including signals corresponding to at least the target object or at least an additional target object, wherein the control system is configured to receive the third signals before receiving the first signals and before receiving the second signals;
retrieving an authenticated fingerprint image from a storage device in the apparatus; and
authenticating the target object or the additional target object based on a comparison of the authenticated fingerprint image with the third signals.

10. The apparatus of claim 9, wherein the control system is further configured for controlling the fingerprint sensor so that receiving the first signals occurs temporally after and is at least partly triggered by the authentication of the target object or the additional target object based on the comparison of the authenticated fingerprint image with the third signals.

11. The apparatus of claim 1, wherein the apparatus comprises a mobile device that includes the fingerprint sensor and the control system.

12. A method of controlling a fingerprint sensor, the method comprising:
receiving first signals from the sensor, the first signals including signals corresponding to residual material deposited on a surface, the surface being a fingerprint sensor surface or a surface of a device proximate an area in which the fingerprint sensor resides and wherein a target object is in contact with or adjacent to the surface;
receiving second signals from the fingerprint sensor, the second signals including signals corresponding to at least the target object; and
performing an authentication process based, at least in part, on the first signals and the second signals, wherein performing the authentication process based, at least in part, on the first signals and the second signals involves:
comparing a first fingerprint image based on the first signals with a second fingerprint image based on the second signals,
determining that the first and second fingerprint images fail a first correlation test requiring a first level of correlation,
retrieving a third fingerprint image from a storage device in the apparatus, the third fingerprint image representing a previously-authenticated fingerprint,
determining that the second and third fingerprint images satisfy a second correlation test requiring a second level of correlation, the second level of correlation being less than the first level of correlation, and
based on determining that the second and third fingerprint images satisfy the second correlation test, authenticating the target object.

13. The method of claim 12, wherein the first correlation test limits relative rotation between the first and second fingerprint images to being less than 10 degrees of rotation.

14. The method of claim 12, wherein the first correlation test limits relative rotation between the first and second fingerprint images to being less than 10 degrees of rotation and wherein the second correlation test allows relative rotation between the second and third fingerprint images to be greater than 30 degrees of rotation.

15. The method of claim 12, wherein the first correlation test limits relative translation between the first and second fingerprint images to being less than a threshold amount and wherein the second correlation test allows relative translation between the second and third fingerprint to be greater than the threshold amount.

16. An apparatus, comprising:
a fingerprint sensor;
a display; and
a control system configured for:
- receiving first signals from the fingerprint sensor, the first signals including signals corresponding to residual material on a surface, the surface being a surface of the fingerprint sensor or a surface of a device proximate an area in which the fingerprint sensor resides and wherein a target object is in contact with or adjacent to the surface;
- receiving second signals from the fingerprint sensor, the second signals including signals corresponding to at least the target object;
- performing an authentication process based, at least in part, on the first signals and the second signals, wherein performing the authentication process involves determining that the first signals form a fingerprint image having an image quality (IQ) metric above one or more thresholds; and
- controlling the display to provide a prompt to clean a portion of the surface responsive to determining that the first signals that form the fingerprint image have the IQ metric above the one or more thresholds.

17. The apparatus of claim 16, wherein the apparatus comprises a mobile device that includes the fingerprint sensor and the control system.

\* \* \* \* \*